(12) United States Patent
Ito

(10) Patent No.: US 11,595,565 B2
(45) Date of Patent: Feb. 28, 2023

(54) IMAGE CAPTURING APPARATUS, METHOD FOR CONTROLLING THE SAME, AND RECORDING MEDIUM FOR AUTOMATIC IMAGE CAPTURING OF A SUBJECT

(71) Applicant: CANON KABUSHIKI KAISHA, Tokyo (JP)

(72) Inventor: Katsuhiro Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/575,161

(22) Filed: Jan. 13, 2022

(65) Prior Publication Data
US 2022/0232159 A1    Jul. 21, 2022

(30) Foreign Application Priority Data

Jan. 18, 2021  (JP) .............................. JP2021-005634

(51) Int. Cl.
  *H04N 5/232*  (2006.01)
  *G06F 3/06*  (2006.01)
  *G06K 9/00*  (2022.01)

(52) U.S. Cl.
  CPC ....... *H04N 5/23218* (2018.08); *G06F 3/0608* (2013.01); *G06F 3/0652* (2013.01); *G06F 3/0653* (2013.01); *H04N 5/23222* (2013.01); *H04N 5/23299* (2018.08)

(58) Field of Classification Search
  CPC ........... H04N 5/23218; H04N 5/23222; H04N 5/23299; G06F 3/0608; G06F 3/0652; G06F 3/0653
  USPC ..................................................... 348/222.1
  See application file for complete search history.

(56) References Cited

U.S. PATENT DOCUMENTS

| | | | |
|---|---|---|---|
| 9,906,610 B1* | 2/2018 | Foster | G06V 20/30 |
| 2007/0140559 A1* | 6/2007 | Rambharack | H04N 19/186 375/E7.166 |
| 2009/0284621 A1* | 11/2009 | Oks | H04N 5/232 348/231.6 |
| 2014/0029859 A1* | 1/2014 | Libin | G06V 40/174 382/224 |
| 2017/0214881 A1* | 7/2017 | Karn | H04N 1/00885 |
| 2018/0091728 A1* | 3/2018 | Brown | G06F 3/04886 |

FOREIGN PATENT DOCUMENTS

JP    2007295181 A    11/2007

* cited by examiner

*Primary Examiner* — Usman A Khan
(74) *Attorney, Agent, or Firm* — Canon U.S.A., Inc. IP Division

(57) ABSTRACT

An image capturing apparatus performs automatic image capturing of a subject by using an image capturing unit, controls a plurality of images acquired by the automatic image capturing to be recorded in a recording unit, selects deletion candidate images from among the plurality of images recorded in the recording unit, based on a predetermined deletion condition, automatically deletes the deletion candidate images, and performs control so that information about images other than the deletion candidate images, among the plurality of images recorded in the recording unit and including the deletion candidate images before being automatically deleted, is transmitted to an external apparatus via a communication unit before the deletion candidate images are deleted so that the information is displayed on the external apparatus.

12 Claims, 14 Drawing Sheets

FIG.7A
IMAGE CAPTURING APPARATUS 100
FIG.7B
SMARTPHONE 110
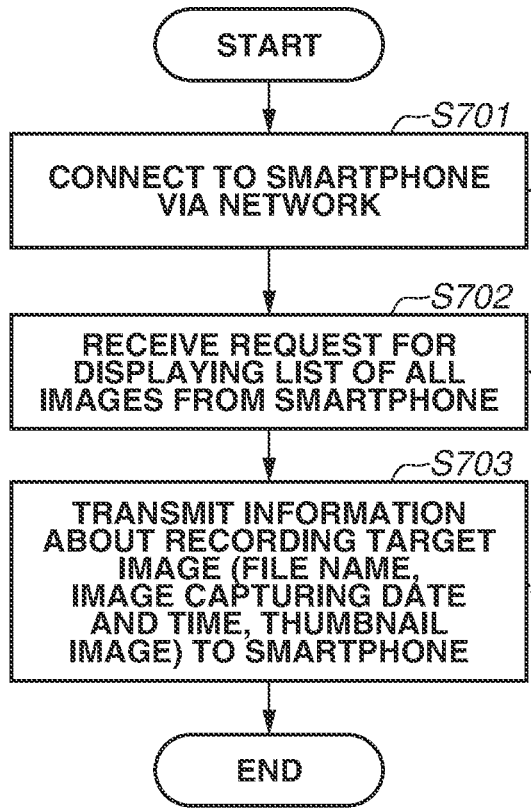
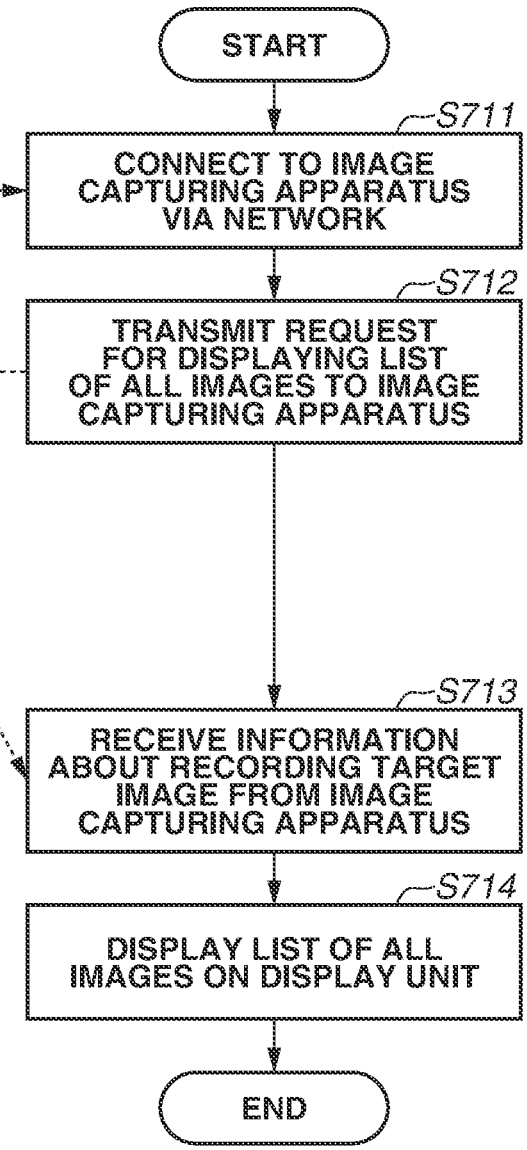

| n | IMAGE ID | | | | | |
|---|---|---|---|---|---|---|
| [0] | 001 | ,002 | ,003 | ,004 | | |
| [1] | 005 | ,006 | ,007 | ,008 | ,009 | ,010 |
| [2] | 011 | ,012 | ,013 | | | |
| [3] | 014 | | | | | |
| [4] | 015 | ,016 | ,017 | ,018 | | |
| [5] | 019 | ,020 | | | | |

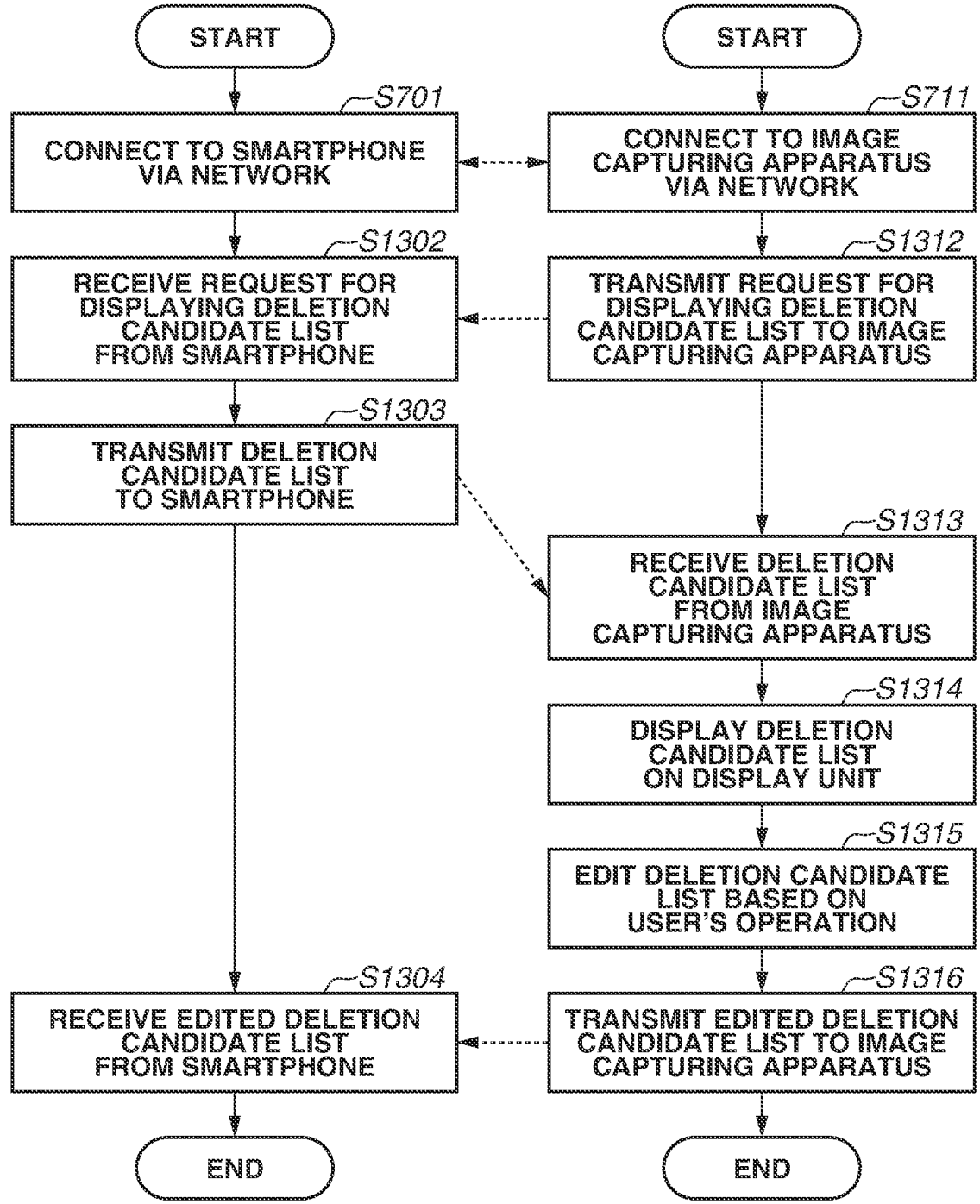

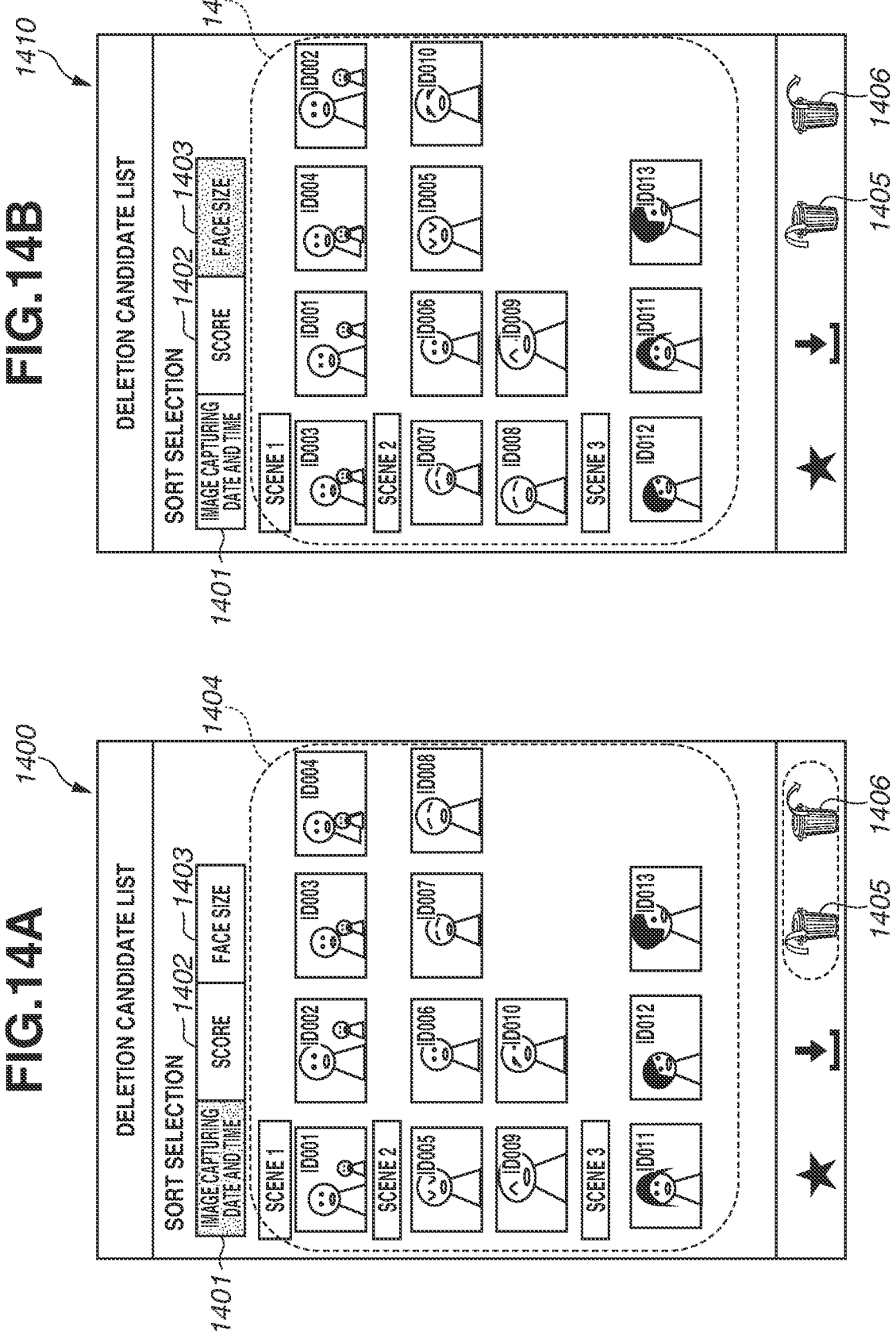

US 11,595,565 B2

IMAGE CAPTURING APPARATUS, METHOD FOR CONTROLLING THE SAME, AND RECORDING MEDIUM FOR AUTOMATIC IMAGE CAPTURING OF A SUBJECT

BACKGROUND

Field of the Disclosure

The present disclosure relates to an image capturing apparatus, a method for controlling the image capturing apparatus, and a recording medium.

Description of the Related Art

In general, images captured by an image capturing apparatus are recorded in a recording unit such as a recording medium. If the remaining storage capacity of the recording unit is insufficient, the image capturing apparatus cannot perform another image capturing operation. Particularly, in the case of an image capturing apparatus that performs remote image capturing without receiving an image capturing instruction from a user, if the remaining storage capacity of the recording unit is insufficient, the user who is not near the image capturing apparatus cannot take necessary measures immediately.

To solve such an issue, Japanese Patent Application Laid-Open No. 2007-295181 discusses a technique for automatically deleting images based on deletion priority in a case where a storage device for storing images is determined to have no available storage capacity, thereby increasing the storage capacity of the storage device.

However, according to the technique discussed in Japanese Patent Application Laid-Open No. 2007-295181, it is difficult for a user of an external apparatus to recognize which images are to be deleted and which images are to be recorded, for example, in a case where the image capturing apparatus that performs remote image capturing automatically deletes images.

SUMMARY

According to an aspect of the present disclosure, an image capturing apparatus includes a processor, and a memory storing a program which, when executed by the processor, causes the image capturing apparatus to perform automatic image capturing of a subject by using an image capturing unit, control a plurality of images acquired by the automatic image capturing to be recorded in a recording unit, select deletion candidate images from among the plurality of images recorded in the recording unit, based on a predetermined deletion condition, automatically delete the deletion candidate images, and perform control so that information about images other than the deletion candidate images, among the plurality of images recorded in the recording unit and including the deletion candidate images before being automatically deleted, is transmitted to an external apparatus via a communication unit before the deletion candidate images are deleted so that the information is displayed on the external apparatus.

Further features of the present disclosure will become apparent from the following description of exemplary embodiments with reference to the attached drawings.

BRIEF DESCRIPTION OF THE DRAWINGS

FIGS. 7A and 7B are flowcharts each illustrating an example of processing performed by the remote image capturing system according to one or more aspects of the present disclosure.

FIGS. 13A and 13B are flowcharts each illustrating an example of processing performed by the remote image capturing system according to one or more aspects of the present disclosure.

FIGS. 14A and 14B each illustrate an example of the deletion candidate list displayed on the smartphone according to one or more aspects of the present disclosure.

DESCRIPTION OF THE EMBODIMENTS

Exemplary embodiments of the present disclosure will be described below with reference to the accompanying drawings.

Figure 1A:
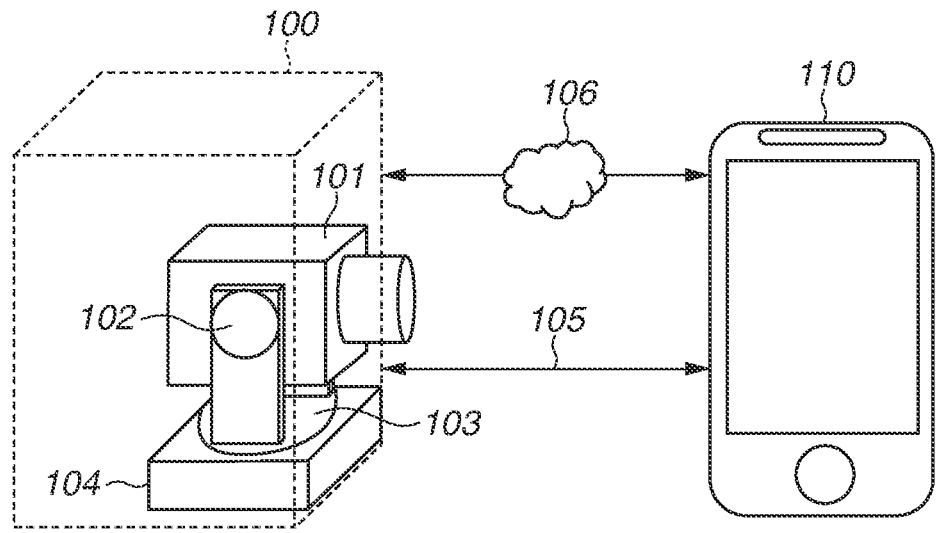
FIG. 1A is a schematic view illustrating an example of a configuration of a remote image capturing system according to one or more aspects of the present disclosure.

FIG. 1A is a schematic view illustrating an example of a configuration of a remote image capturing system according to a first exemplary embodiment of the present disclosure.

The remote image capturing system includes an image capturing apparatus 100 and a smartphone 110. The smartphone 110 is an external apparatus that remotely operates the image capturing apparatus 100. The image capturing apparatus 100 and the smartphone 110 are communicably connected to each other.

The image capturing apparatus 100 includes a lens barrel 101, a tilt unit 102, a pan unit 103, and a controller unit 104.

The lens barrel 101 includes an image capturing lens unit (a lens unit 201 in FIG. 2) serving as an image capturing optical system and an image sensor. The image capturing lens unit includes movable lenses, such as a focus lens and a zoom lens, and a drive circuit for driving the movable lenses. The movable lenses are driven by the controller unit 104. The lens barrel 101 captures images under control of the controller unit 104, and outputs the captured images to the controller unit 104. The lens barrel 101 is attached to the tilt unit 102 in such a manner that the lens barrel 101 is rotatable about a horizontal axis.

The tilt unit 102 functions as a tilt drive unit. The tilt unit 102 drives the lens barrel 101 to rotate about the horizontal axis (i.e., in the tilt direction) orthogonal to an optical axis of the image capturing optical system, according to an instruction from the controller unit 104. An elevation angle or depression angle of the lens barrel 101 (the optical axis) is changed by the tilt unit 102. The tilt unit 102 is attached to the pan unit 103 in such a manner that the tilt unit 102 is rotatable about a vertical axis.

The pan unit 103 functions as a pan drive unit. The pan unit 103 drives the tilt unit 102 to rotate about the vertical axis (i.e., in the pan direction) orthogonal to the optical axis of the image capturing optical system, according to an instruction from the controller unit 104. The pan unit 103 rotates the tilt unit 102 to change an azimuth angle of the lens barrel 101 (the optical axis) attached to the tilt unit 102.

Figure 1B:
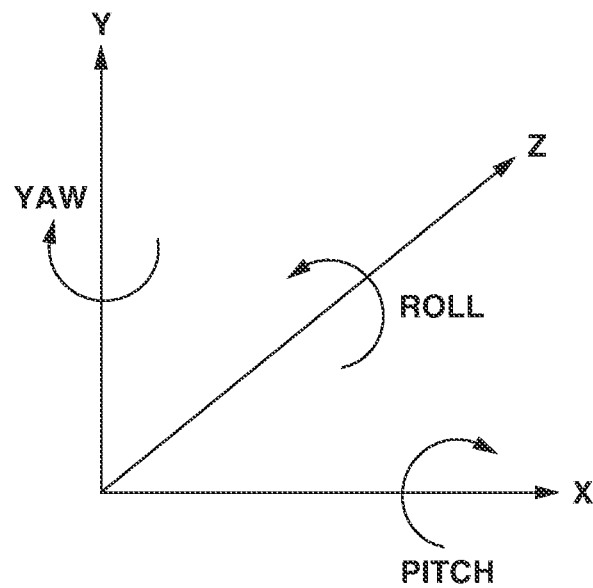
FIG. 1B is a graph illustrating a Cartesian coordinate system according to one or more aspects of the present disclosure.

FIG. 1B is a graph illustrating a Cartesian coordinate system in which the optical axis of the image capturing optical system is set as a Z-axis and the intersection between the image sensor and the optical axis is set as an origin. The tilt unit 102 has a rotation axis about an X-axis (i.e., in a pitch direction) and the pan unit 103 has a rotation axis about a Y-axis (i.e., in a yaw direction).

The controller unit 104 controls the driving of the movable lenses included in the lens barrel 101, the image capturing operation by the lens barrel 101, and the operation of each of the tilt unit 102 and the pan unit 103, in response to an instruction via an operation unit included in the smartphone 110 or the image capturing apparatus 100. The controller unit 104 transmits the images captured by the lens barrel 101 and various kinds of information about the image capturing apparatus 100 to the smartphone 110. The controller unit 104 collects surrounding sound from a mounted microphone (not illustrated), analyzes the collected sound, and recognizes the analyzed sound as a command, thereby controlling the image capturing apparatus 100 based on the contents of the command. While FIG. 1A illustrates an example where the controller unit 104 is provided in a base that supports the pan unit 103, the controller unit 104 may be provided in the lens barrel 101, the tilt unit 102, or the pan unit 103.

The smartphone 110 is an example of an electronic apparatus capable of remotely operating the image capturing apparatus 100. For example, the smartphone 110 can execute a remote image capturing application to remotely operate the image capturing apparatus 100. The smartphone 110 and the image capturing apparatus 100 can communicate with each other through a direct wireless or wired communication 105, or through a communication 106 via a computer network, a telephone network, or the like. The image capturing apparatus 100 and the smartphone 110 communicate with each other using any communication protocol supported by both the image capturing apparatus 100 and the smartphone 110.

Figure 2:
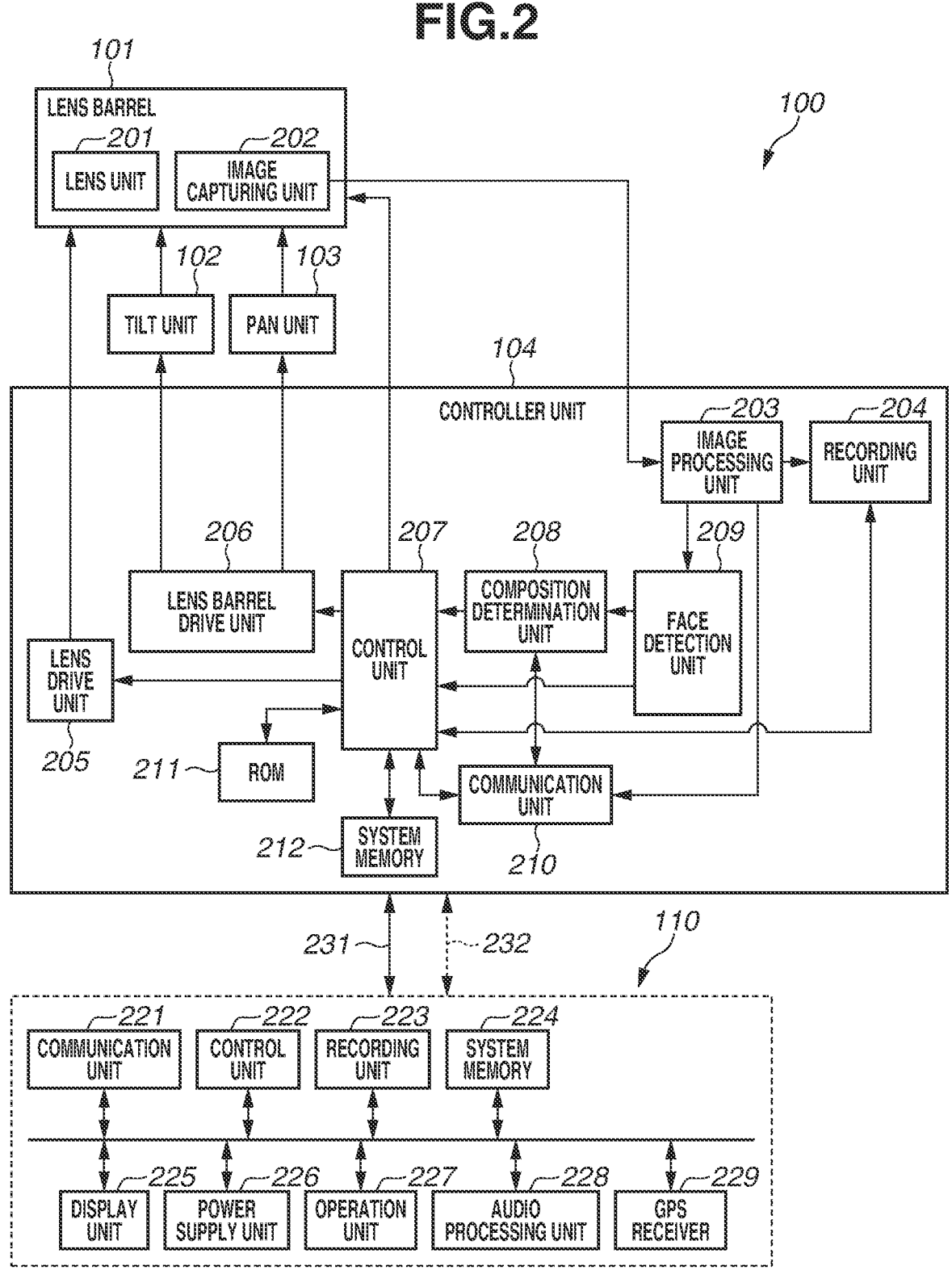
FIG. 2 is a block diagram illustrating an example of a functional configuration of the remote image capturing system according to one or more aspects of the present disclosure.

FIG. 2 is a block diagram illustrating an example of a functional configuration of the remote image capturing system. Components similar to those in FIG. 1A are denoted by the same reference numerals.

A configuration of the image capturing apparatus 100 will now be described.

The lens barrel 101 includes the lens unit 201 (the image capturing optical system) and an image capturing unit 202.

The lens barrel 101 is rotated by the tilt unit 102 and the pan unit 103 to adjust an optical axis direction of the lens barrel 101.

The movable lenses, such as the focus lens and the zoom lens, included in the lens unit 201 are driven by a lens drive unit 205 in the controller unit 104. The lens unit 201 forms an optical image on an image capturing surface of the image sensor included in the image capturing unit 202.

The image capturing unit 202 includes the image sensor such as a complementary metal-oxide semiconductor (CMOS) image sensor. In the image sensor, a plurality of photoelectric conversion elements converts the optical image formed by the lens unit 201 into an analog signal group (analog image signals). The image capturing unit 202 performs analog-to-digital (A/D) conversion, noise reduction processing, and the like on the analog image signals, and outputs the processed signals as image data to the controller unit 104.

The tilt unit 102 has a drive mechanism for rotating the lens barrel 101 in the pitch direction illustrated in FIG. 1B. The pan unit 103 has a drive mechanism for rotating the tilt unit 102 in the yaw direction illustrated in FIG. 1B. The lens barrel 101 is rotated in response to a drive instruction output from a lens barrel drive unit 206.

The controller unit 104 includes an image processing unit 203, a recording unit 204, the lens drive unit 205, the lens barrel drive unit 206, a control unit 207, a composition determination unit 208, a face detection unit 209, a communication unit 210, a read-only memory (ROM) 211, and a system memory 212.

The image processing unit 203 performs image processing, such as distortion correction, white balance adjustment, color interpolation processing, or coding processing, on the image data output from the image capturing unit 202, and generates image data for recording and image data (a live view image) for display. The image data for display may be obtained by reducing the resolution of the image data for recording. The image processing unit 203 may generate the image data for recording and not generate the image data for display. The image data for recording is output to the recording unit 204.

The recording unit 204 is a recording medium, such as a nonvolatile memory, that is detachably attached to the image capturing apparatus 100 or is incorporated into the image capturing apparatus 100. The recording unit 204 stores the image data output from the image processing unit 203, in a data file in a format such as Joint Photographic Experts Group (JPEG) or Moving Picture Experts Group (MPEG) depending on the specifications. The image data subjected to the image processing by the image processing unit 203 is also output to the face detection unit 209 and the communication unit 210.

The face detection unit 209 performs known face detection processing on the image data output from the image processing unit 203, and detects an area likely to include the face of a person (i.e., a face area). The face detection unit 209 outputs the detection result (the number of face areas and positional information) to the composition determination unit 208. The face area is an example of a subject area for which the image capturing apparatus 100 performs a tracking function or an automatic composition determination function. Thus, the face detection unit 209 is an example of a component for detecting a predetermined subject area.

The face detection unit 209 outputs information about the detected face area and the positional information to the control unit 207, and also converts parameters related to facial expressions, such as the degree of smile and the degree of eye opening, into values using a known expression measurement technique and outputs the values to the control unit 207.

The communication unit 210 is a communication interface for establishing a communication between the image capturing apparatus 100 and the smartphone 110 or another external apparatus. The communication unit 210 has a configuration that supports one or more types of wired communication and wireless communication. Examples of communication standards supported by the communication unit 210 include a universal serial bus (USB), Ethernet®, High-Definition Multimedia Interface (HDMI®), a wireless local area network (LAN) (Institute of Electrical and Electronics Engineers (IEEE) 802.11 series), Bluetooth®, 3rd Generation Partnership Project (3GPP) 3G, 4G, and 5G. However, the communication standards supported by the communication unit 210 are not limited thereto.

The lens drive unit 205 drives the zoom lens and the focus lens included in the lens unit 201, based on instructions (e.g., a target position instruction and a driving speed instruction) output from the control unit 207.

The lens barrel drive unit 206 drives the tilt unit 102 and the pan unit 103, based on instructions (e.g., a rotational direction instruction and a rotation amount instruction) output from the control unit 207.

The control unit 207 is, for example, a microprocessor such as a central processing unit (CPU). The control unit 207 loads a program recorded in the ROM 211 into the system memory 212 and executes the program, thereby controlling the operation of each unit of the image capturing apparatus 100 and implementing the functions of the image capturing apparatus 100. Furthermore, the control unit 207 generates instructions or commands (e.g., a target position instruction and a driving speed instruction) for controlling the lens drive unit 205 and the lens barrel drive unit 206, based on magnification information and positional information output from the composition determination unit 208. The control unit 207 then outputs the generated instructions to the lens drive unit 205 and the lens barrel drive unit 206. Furthermore, the control unit 207 makes a determination on an image capturing condition by using control information to be output to the lens barrel drive unit 206 and using a score that is evaluation information calculated based on the expression of the face included in the face area output from the face detection unit 209. If the image capturing condition is satisfied, the control unit 207 issues an image capturing instruction to the lens barrel 101. Furthermore, the control unit 207 performs processing for receiving a communication command from the smartphone 110 via the communication unit 210 and processing for periodically monitoring a remaining storage capacity of the recording unit 204.

The composition determination unit 208 determines a composition based on the positional information about the face area detected in the image by the face detection unit 209. For example, the composition determination unit 208 determines a magnification so that the face area has a predetermined size or more. For example, the composition determination unit 208 determines an image capturing direction so that the face area is located at the center of the image. The composition determination unit 208 calculates the target magnification and the target position (the pan angle and the tilt angle) to achieve the determined magnification and the determined image capturing direction, and outputs the target magnification and the target position to the control unit 207. The composition determination method is not limited thereto, and any other method may be used. In a case where a command for a pan operation, a tilt operation, or a zoom operation is received from the smartphone 110 via the communication unit 210, the composition determination unit 208 determines the target position and the target magnification based on the received command, and outputs the target position and the target magnification to the control unit 207 and the communication unit 210. The operation of the composition determination unit 208 may be performed by the control unit 207.

The ROM 211 is a rewritable nonvolatile memory. Programs to be executed by the control unit 207, registered voice commands, and various setting values for the image capturing apparatus 100 are recorded in the ROM 211.

The system memory 212 is used by the control unit 207 to execute the programs.

Next, a configuration of the smartphone 110 will be described.

The smartphone 110 includes a communication unit 221, a control unit 222, a recording unit 223, a system memory 224, a display unit 225, a power supply unit 226, an operation unit 227, an audio processing unit 228, and a global positioning system (GPS) receiver 229.

The communication unit 221 is a communication interface for establishing a communication between the smartphone 110 and the image capturing apparatus 100 or another external apparatus. The communication unit 221 basically has a similar configuration to that of the communication unit 210 included in the image capturing apparatus 100. However, since the smartphone 110 includes a calling function, the communication unit 221 includes a function for communicating with a telephone communication network.

The control unit 222 is a microprocessor such as a CPU. The control unit 222 loads a program recorded in the recording unit 223 into the system memory 224 and executes the program, thereby controlling the operation of each unit of the smartphone 110 and implementing the functions of the smartphone 110.

The recording unit 223 is a rewritable nonvolatile memory. Programs to be executed by the control unit 222, various setting values for the smartphone 110, graphic user interface (GUI) data, and the like are recorded in the recording unit 223. The remote image capturing application is also recorded in the recording unit 223. The remote image capturing application is used to transmit various requests to the image capturing apparatus 100 and receive images, image information, and the like from the image capturing apparatus 100.

The system memory 224 is used by the control unit 222 to execute the programs. A part of the system memory 224 is also be used as a video memory for the display unit 225.

The power supply unit 226 supplies power to each component of the smartphone 110.

The display unit 225 is, for example, a touch display. The display unit 225 may include other functions such as a fingerprint sensor and a speaker. The display unit 225 displays a user interface (UI) provided by an operating system (OS) or application of the smartphone 110, the captured images, and the like.

The operation unit 227 is a generic term for input devices used, for example, by a user to issue instructions to the smartphone 110. The operation unit 227 includes a volume adjustment button and a power button. The operation unit 227 also includes a touch panel provided on the display unit 225.

The audio processing unit 228 processes, for example, an audio signal obtained from a microphone incorporated into the smartphone 110. The audio processing unit 228 may include a voice recognition function. In this case, the user can use his/her voice to input a command or text. The voice recognition function may be implemented by using a function of an external apparatus communicable via the communication unit 221.

The GPS receiver 229 acquires positional information (longitude and latitude information) about the smartphone 110 by performing positioning processing based on signals received from a GPS satellite. The smartphone 110 may acquire the positional information by using another method such as a Wi-Fi® Positioning System (WPS). The control unit 222 can use information indicating that the current position of the smartphone 110 is included in a preset geographical range, or information indicating that a predetermined change of the current position is detected, as event information for controlling the image capturing apparatus 100. The control unit 222 can use the event information as, for example, a trigger for starting or stopping the image capturing by the image capturing apparatus 100.

The image capturing apparatus 100 and the smartphone 110 establish a bidirectional communication through the communication units 210 and 221. For example, the image capturing apparatus 100 transmits the image signals output from the image capturing unit 202, various kinds of information about the image capturing apparatus 100, audio signals, and the like to the smartphone 110, and receives various commands from the smartphone 110. The smartphone 110 transmits commands for starting and stopping panning, tilting, zooming, image capturing, and the like to the image capturing apparatus 100, and receives execution results of the commands.

The communication units 210 and 221 can establish a communication by simultaneously or selectively using a plurality of communication paths based on different communication standards. The communication units 210 and 221 can establish a communication using, for example, a first communication path 231 based on a first standard (e.g., a wireless LAN standard) and a second communication path 232 based on a second standard (e.g., a Bluetooth® Low Energy standard). The communication units 210 and 221 establish a communication based on a plurality of standards for appropriate power consumption, communicable distance, and communication speed depending on the intended use of the communication, thereby achieving lower power consumption and higher communication efficiency.

After start-up of the image capturing apparatus 100, the control unit 207 of the image capturing apparatus 100 monitors reception of a communication request through the communication unit 210. In this state, the control unit 207 may capture moving images or periodically capture still images, and may record the captured images in the recording unit 204.

When the smartphone 110 executes the remote image capturing application, the control unit 222 of the smartphone 110 transmits the communication request to the image capturing apparatus 100. Information for establishing a communication with the image capturing apparatus 100 is assumed to be set in the recording unit 223.

Upon receiving the communication request from the smartphone 110 via the communication unit 210, the control unit 207 of the image capturing apparatus 100 exchanges information with the control unit 222 based on a procedure prescribed in the communication standard and establishes a communication. When the communication with the smartphone 110 has been established, the control unit 207 transmits various kinds of information about the image capturing apparatus 100 to the smartphone 110 via the communication unit 210. Examples of the various kinds of information about the image capturing apparatus 100 include information about the model name of the image capturing apparatus 100 and the size of the image sensor, and information about the image capturing optical system. The information about the image capturing optical system includes a focal length corresponding to 1× zoom magnification, lens information (the zoom magnification of the image capturing optical system, the tilt angle of the tilt unit 102, and the pan angle of the pan unit 103), and adjustable ranges of the image capturing optical system (e.g., respective minimum values and maximum values of the magnification, the tilt angle, and the pan angle).

The control unit 207 of the image capturing apparatus 100 starts transmission of the captured images to the smartphone 110 via the communication unit 210. The images to be transmitted to the smartphone 110 may be the image data for display output from the image processing unit 203. If the image processing unit 203 does not generate the image data for display, the control unit 207 may generate the image data for display based on the image data for recording. Here, the image capturing apparatus 100 captures a moving image with a predetermined frame rate, but instead may capture a still image in response to an instruction from the smartphone 110.

Upon receiving the various kinds of information from the image capturing apparatus 100, which has established a communication with the smartphone 110, the control unit 222 of the smartphone 110 records the various kinds of information in the system memory 224. When starting reception of the images from the image capturing apparatus 100, the control unit 222 displays on the display unit 225 a GUI screen generated by the remote image capturing application.

Next, processing for automatically deleting the images automatically captured by the image capturing apparatus 100 will be described.

Figure 3:
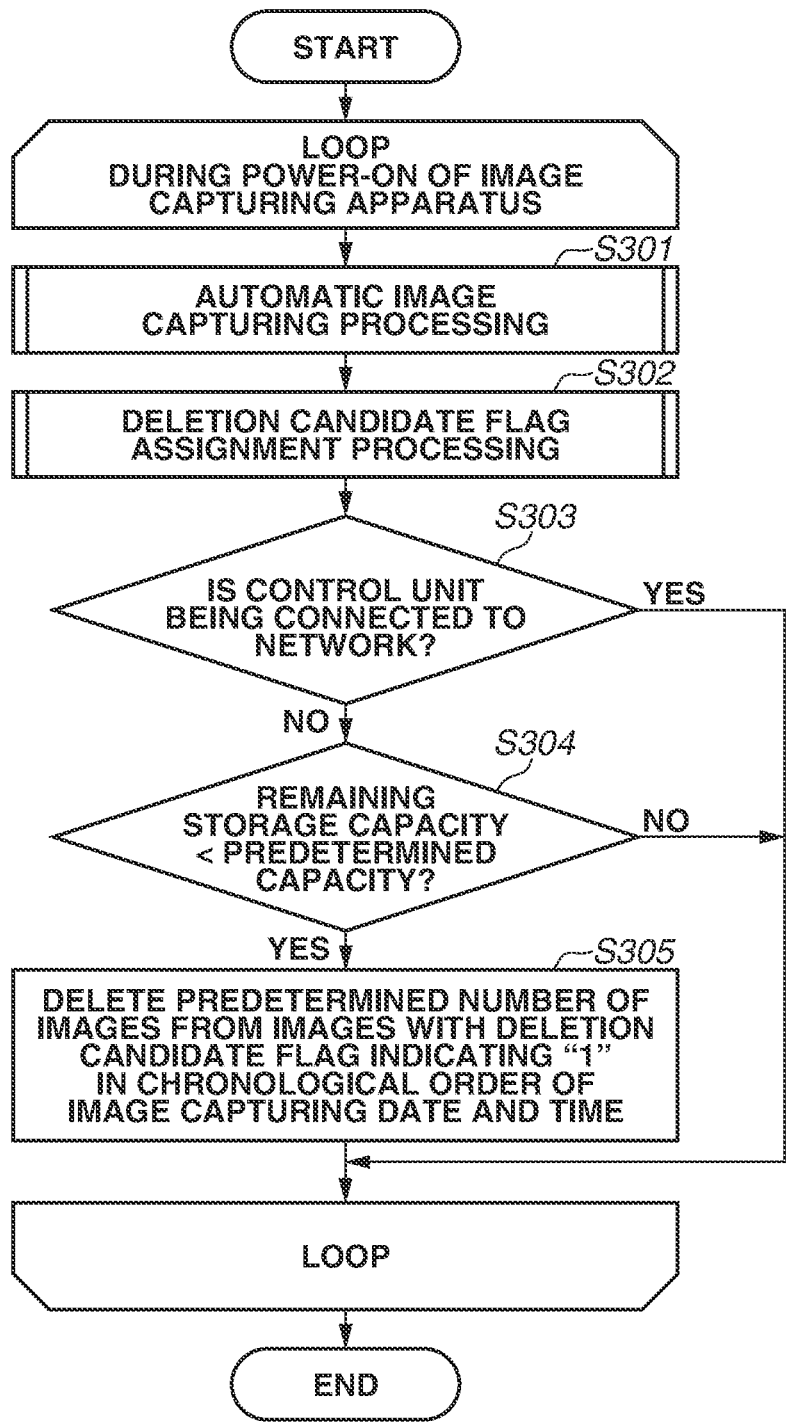
FIG. 3 is a flowchart illustrating an example of control processing according to one or more aspects of the present disclosure.

FIG. 3 is a flowchart illustrating an example of control processing performed by the image capturing apparatus 100. The flowchart illustrated in FIG. 3 is implemented by the control unit 207 loading a program recorded in the ROM 211 into the system memory 212 and executing the program. During power-on, the control unit 207 of the image capturing apparatus 100 repeats processing of steps S301 to S305 to be described below.

In step S301, the control unit 207 of the image capturing apparatus 100 performs automatic image capturing processing. The automatic image capturing processing will be described in detail below with reference to a flowchart illustrated in FIG. 4.

In step S302, the control unit 207 performs deletion candidate flag assignment processing. The deletion candidate flag assignment processing will be described in detail below with reference to a flowchart illustrated in FIG. 5.

In step S303, the control unit 207 determines whether the control unit 207 is being connected to the network via the communication unit 210. If the control unit 207 is not being connected to the network (NO in step S303), the processing proceeds to step S304. If the control unit 207 is being connected to the network (YES in step S303), the processing returns to step S301 without performing the processing of steps S304 and S305.

In step S304, the control unit 207 determines whether the remaining storage capacity of the recording unit 204 is less than a predetermined capacity. If the remaining storage capacity is less than the predetermined capacity (YES in step S304), the processing proceeds to step S305. If the remaining storage capacity is more than or equal to the predetermined capacity (NO in step S304), the processing returns to step S301 without performing the processing of step S305.

In step S305, the control unit 207 deletes deletion candidate images from the images recorded in the recording unit 204. More specifically, the control unit 207 deletes a predetermined number of images with a deletion candidate flag (described below) indicating "−1" from the recording unit 204. The predetermined number is, for example, five. If the number of images with the deletion candidate flag indicating "−1" that are recorded in the recording unit 204 is less than the predetermined number, the control unit 207 deletes all the images with the deletion candidate flag indicating "−1". For example, if three images with the deletion candidate flag indicating "−1" are recorded in the recording unit 204, the control unit 207 deletes all the three images.

On the other hand, if six images with the deletion candidate flag indicating "−1" are recorded in the recording unit 204 (if the number of images with the deletion candidate flag indicating "−1" is more than or equal to the predetermined number), the control unit 207 deletes five of the images at a time. Accordingly, one of the images is not deleted and remains recorded in the recording unit 204. As described above, the deletion candidate images are deleted on a predetermined number basis during the automatic image capturing processing, instead of deleting the deletion candidate images at a time, thereby making it possible to reduce the load and time for the deletion processing and prevent the deletion processing from interfering with the automatic image capturing processing.

In the processing of the flowchart illustrated in FIG. 3, steps S303 and S304 may be replaced with each other and step S303 may be carried out before step S304. In this case, even in a case where the remaining storage capacity is less than the predetermined capacity, if the connection to the network is established, the processing returns to step S301 without proceeding to step S305, so that the images recorded in the recording unit 204 are not deleted. It is thus possible to prevent the images from being automatically deleted while the connection to the network is established.

Figure 4:
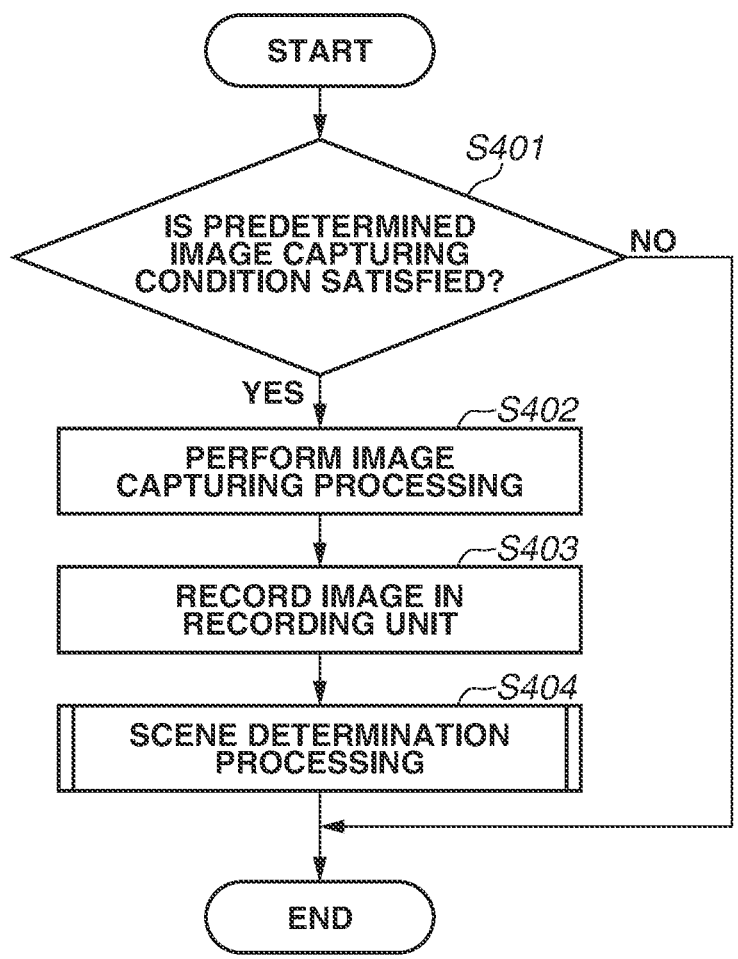
FIG. 4 is a flowchart illustrating an example of automatic image capturing processing according to one or more aspects of the present disclosure.

FIG. 4 is a flowchart illustrating an example of the automatic image capturing processing performed by the image capturing apparatus 100. FIG. 4 illustrates detailed processing of step S301 in the flowchart illustrated in FIG. 3 described above.

In step S401, the control unit 207 of the image capturing apparatus 100 determines whether a predetermined image capturing condition is satisfied, based on the live view image output from the image processing unit 203. More specifically, the face detection unit 209 detects a face area from the live view image and calculates a score using information about the face of a person included in the face area and about the expression of the face.

At this time, the score is calculated based on a basic score and a correction score.

The basic score is calculated by the following formula using the degree of smile and the degree of eye opening.

Basic score=(degree of smile×7+degree of eye opening×3)÷10

The degree of smile increases with a bigger smile on the face in the face area. The degree of eye opening increases with wider opening of eyes in the face area. Each of the value of the degree of smile and the value of the degree of eye opening is any one of the values ranging from "0" to "100", and the basic score is also any one of the values ranging from "0" to "100".

The correction score is a score for correcting the basic score. For example, the correction score is a value indicating a face size, a face orientation, and a face position output from the face detection unit 209. The value of the face size is any one of the values ranging from "0" to "100". The value of the face orientation is any one of the values indicating the front, rightward 45°, rightward 90°, leftward 45°, and leftward 90°, respectively. The value of the face position is a value in a range of 640×480 dots which indicates the central position of the face of a main subject in the image.

A final score is calculated as follows by correcting the basic score with the correction score.

<Final Score Calculation Method>

(a) Deduction of Points Based on Face Size:
When the value of the face size is less than or equal to "30", 10 points are deducted from the basic score.

(b) Addition of Points Based on Face Orientation:
When the face faces the front, 10 points are added to the basic score.

(c) Deduction of Points Based on Face Position:
When the face position satisfies any one of the following four conditions, 50 points are deducted from the basic score.
  The value obtained by adding the value corresponding to one-half of the face size to the value of the horizontal face position is greater than "640".
  The value obtained by subtracting the value corresponding to one-half of the face size from the value of the horizontal face position is less than "0".
  The value obtained by adding the value corresponding to one-half of the face size to the value of the vertical face position is greater than "480".
  The value obtained by subtracting the value corresponding to one-half of the face size from the value of the vertical face position is less than "0".

The final score is limited to the range from "0" to "100" points. If the calculated points are less than "0", the final score is determined as "0", and if the calculated points are more than "100", the final score is determined as "100".

The control unit 207 records information about the calculated final score in the recording unit 204 as meta data to be added to the image. If the final score is more than or equal to a specified score, the control unit 207 determines that the image capturing condition is satisfied. If the final score is less than the specified score, the control unit 207 determines that the image capturing condition is not satisfied. If the image capturing condition is satisfied (YES in step S401), the processing proceeds to step S402. If the image capturing condition is not satisfied (NO in step S401), the automatic image capturing processing ends.

The score calculation method and the method for determining whether the image capturing condition is satisfied are not limited to the above-described methods. To calculate the score, for example, an angle of view, a focus state, and an image stabilization (IS) state may be used. The specified score may be a fixed value or a variable value that varies depending on the time or other conditions.

In step S402, the control unit 207 issues an image capturing instruction to the image capturing unit 202, so that the image capturing unit 202 performs image (still image or moving image) capturing processing based on the image capturing instruction.

In step S403, the control unit 207 records, in the recording unit 204, the image that is output from the image capturing unit 202 and is subjected to the image processing by the image processing unit 203. The control unit 207 also records image capturing date and time information in the recording unit 204 in association with the image.

In step S404, the control unit 207 performs scene determination processing using the face area, the positional information thereof, the pan angle information, the image capturing date and time information, and the like, and ends the automatic image capturing processing. The scene determination processing will be described in detail next with reference to the flowchart illustrated in FIG. 5.

Figure 5:
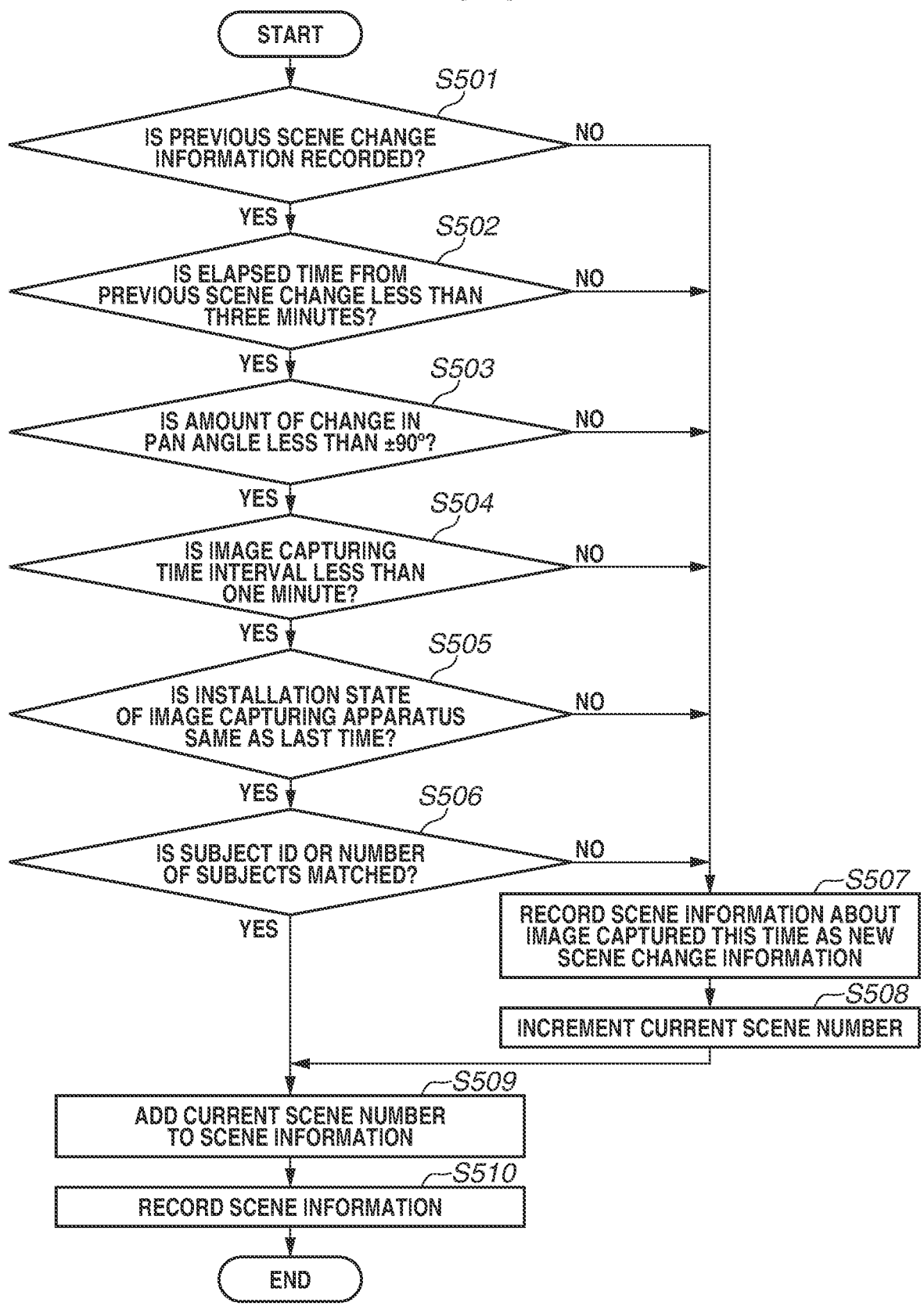
FIG. 5 is a flowchart illustrating an example of scene determination processing according to one or more aspects of the present disclosure.

FIG. 5 is a flowchart illustrating an example of the scene determination processing performed by the image capturing apparatus 100. FIG. 5 illustrates detailed processing of step S404 in the flowchart illustrated in FIG. 4 described above.

In step S501, the control unit 207 determines whether scene change information about a scene change determined last time is recorded. The term "scene change" used herein refers to a state where a scene has changed between captured images. The scene change information includes various kinds of information (described below) about the scene change.

If the scene change information is recorded (YES in step S501), the processing proceeds to step S502. If the scene change information is not recorded (NO in step S501), the processing proceeds to step S507.

In step S502, the control unit 207 compares the image capturing date and time information about the image captured this time with the image capturing date and time information included in the recorded previous scene change information, and determines whether an elapsed time from the previous scene change is less than a predetermined period. The predetermined period is, for example, three minutes. If the elapsed time is less than the predetermined period (YES in step S502), the control unit 207 determines that the scene has not changed from the previous scene and the processing proceeds to step S503. If the elapsed time is more than or equal to the predetermined period (NO in step S502), the control unit 207 determines that the scene has changed and the processing proceeds to step S507.

In step S503, the control unit 207 compares the pan angle of the pan unit 103 in the image capturing this time with the pan angle of the pan unit 103 in the previous scene change, and determines whether the amount of change in the pan angle is less than a predetermined angle. The predetermined angle is, for example, ±90°. If the amount of change in the pan angle is less than the predetermined angle (YES in step S503), the control unit 207 determines that the scene has not changed from the previous scene and the processing proceeds to step S504. If the amount of change in the pan angle is more than or equal to the predetermined angle (NO in step S503), the control unit 207 determines that the scene has changed and the processing proceeds to step S507. Alternatively, the control unit 207 may compare the pan angle of the pan unit 103 in the image capturing this time with the pan angle of the pan unit 103 in the image capturing last time. In this case, the control unit 207 can determine whether the amount of change in the pan angle is less than a predetermined angle and determine that the scene has changed if the amount of change in the pan angle is more than or equal to the predetermined angle.

In step S504, the control unit 207 compares the image capturing date and time information about the image captured this time with the image capturing date and time information about the image captured last time, and determines whether an image capturing time interval is less than a predetermined period. The predetermined period is, for example, one minute. If the image capturing time interval is less than the predetermined period (YES in step S504), the control unit 207 determines that the scene has not changed from the previous scene and the processing proceeds to step S505. If the image capturing time interval is more than or equal to the predetermined period (NO in step S504), the control unit 207 determines that the scene has changed and the processing proceeds to step S507.

In step S505, the control unit 207 compares an installation state of the image capturing apparatus 100 (e.g., a state where the image capturing apparatus 100 is placed or carried) in the image capturing this time with the installation state of the image capturing apparatus 100 in the image capturing last time, and determines whether the installation state has not changed. The control unit 207 can determine the installation state based on the IS state in image capturing. If the installation state has not changed (YES in step S505), the control unit 207 determines that the scene has not changed from the previous scene and the processing proceeds to step S506. If the installation state has changed (NO in step S505), the control unit 207 determines that the scene has changed and the processing proceeds to step S507.

In step S506, the control unit 207 compares subject information, such as a subject identifier (ID) for identifying a subject type, or the number of subjects between the image captured this time and the several images captured in the past, and determines whether the subject IDs or the numbers of subjects match each other. The subject ID is assigned to each person included in the face area detected from the captured image by the face detection unit 209, and is recorded in the recording unit 204 in association with the image of the face of the person by the control unit 207. If the subject IDs or the numbers of subjects match each other (YES in step S506), the control unit 207 determines that the scene has not changed from the previous scene and the processing proceeds to step S509. If the subject IDs or the numbers of subjects do not match each other (NO in step S506), the control unit 207 determines that the scene has changed and the processing proceeds to step S507. A specific example of the determination method is that the control unit 207 excludes a temporary change, such as a movement of a subject outside the angle of view for a moment, in scene change determination. For example, if the subject ID and the number of subjects in the image captured this time match those in two of three images captured in the past, the control unit 207 determines that the scene has not changed. If the subject ID and the number of subjects in the image captured this time are different from those in two of the three images captured in the past, the control unit 207 determines that the scene has changed.

In step S507, the control unit 207 determines that the scene of the image captured this time is a new scene or a scene changed from the previous scene, and records scene information about the image captured this time, in the system memory 212 as scene change information. The scene information includes the image capturing date and time information, the pan angle information, the installation information about the image capturing apparatus 100, the subject information, and the information indicating the number of subjects, which are used to determine whether the scene has changed in steps S501 to S506 described above.

In step S508, the control unit 207 increments the current scene number.

In step S509, the control unit 207 adds the current scene number to the scene information about the image captured this time.

In step S510, the control unit 207 records the scene information with the scene number added thereto in the recording unit 204 in association with the image captured this time, and ends the scene determination processing.

Figure 6:
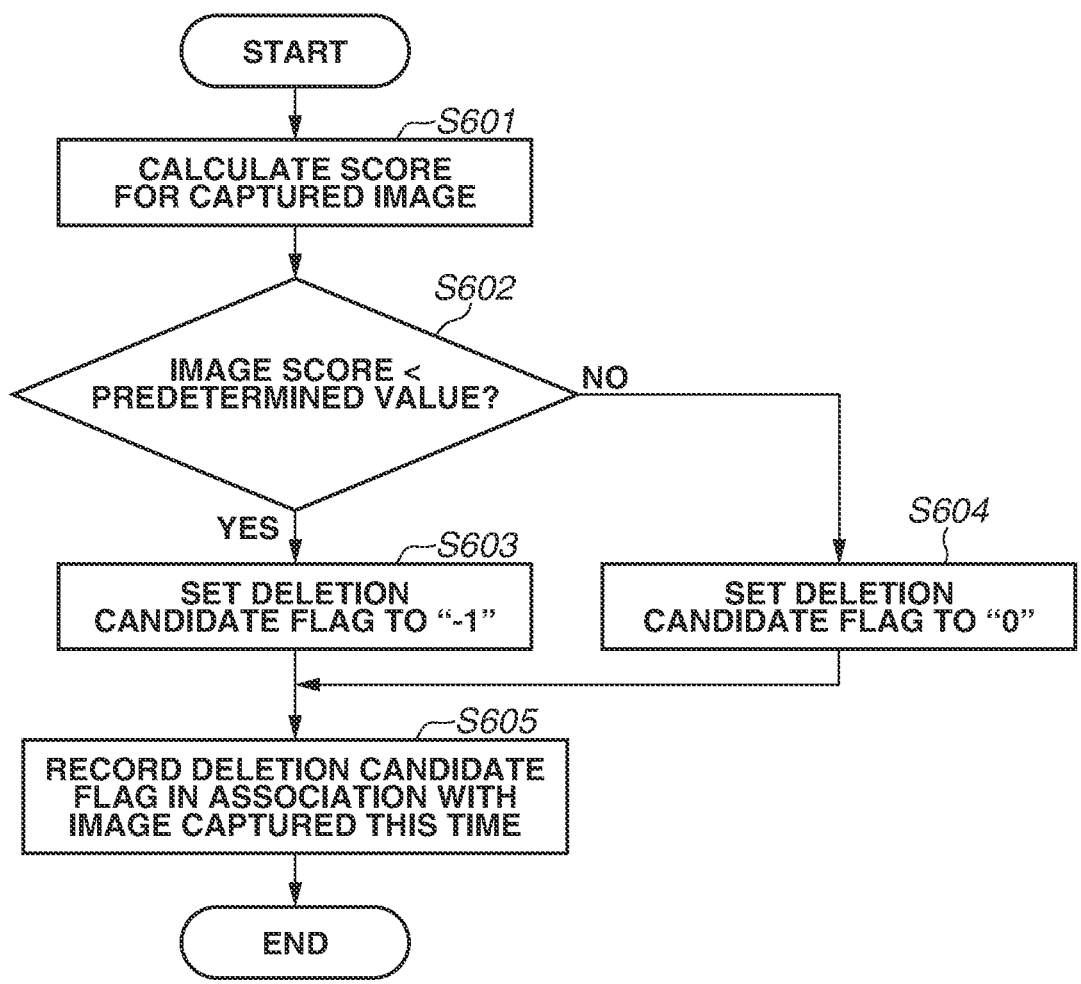
FIG. 6 is a flowchart illustrating an example of deletion candidate flag assignment processing according to one or more aspects of the present disclosure.

FIG. 6 is a flowchart illustrating an example of the deletion candidate flag assignment processing performed by the image capturing apparatus 100. FIG. 6 illustrates detailed processing of step S302 illustrated in FIG. 3 described above.

In step S601, the control unit 207 analyzes the captured image and acquires the score calculated by the face detection unit 209. The score can be calculated using a method similar to the score calculation method used in step S401 described above. The control unit 207 records the calculated score (the image score) and the face size used to calculate the score in the recording unit 204 in association with the image.

In step S602, the control unit 207 determines whether the calculated score is less than a predetermined value. The predetermined value may be a fixed value or a variable value that varies depending on a user's instruction or the like. If the score is less than the predetermined value (YES in step S602), the processing proceeds to step S603. If the score is more than or equal to the predetermined value (NO in step S602), the processing proceeds to step S604.

In step S603, the control unit 207 determines the image captured this time as a candidate image to be automatically deleted, and sets the deletion candidate flag to "−1".

In step S604, the control unit 207 determines the image captured this time as an image that is not a candidate image to be automatically deleted, i.e., a recording target image, and sets the deletion candidate flag to "0".

In step S605, the control unit 207 records the set deletion candidate flag in the recording unit 204 in association with the image captured this time, and ends the deletion candidate flag assignment processing.

With the above-described processing, all images recorded in the recording unit 204 are associated with the deletion candidate flag indicating "−1" or "0". In a case where the remaining storage capacity of the recording unit 204 becomes low, the images with the deletion candidate flag indicating "−1" are automatically deleted in step S305 illustrated in FIG. 3 described above. Accordingly, the image capturing apparatus 100 can continuously perform the automatic image capturing processing.

Next, processing performed by the remote image capturing system to enable the user of the smartphone 110 to recognize the recorded images will be described.

FIG. 7A is a flowchart illustrating an example of processing performed by the image capturing apparatus 100. FIG. 7B is a flowchart illustrating an example of processing performed by the smartphone 110. The flowchart illustrated in FIG. 7A is implemented by the control unit 207 of the image capturing apparatus 100 loading a program recorded in the ROM 211 into the system memory 212 and executing the program. The flowchart illustrated in FIG. 7B is implemented by the control unit 222 executing the remote image capturing application started by the user of the smartphone 110. The flowcharts illustrated in FIGS. 7A and 7B are performed at any timing during power-on of the image capturing apparatus 100, more specifically, during a period in which the control processing in the flowchart illustrated in FIG. 3 is performed.

In step S701, the control unit 207 of the image capturing apparatus 100 is connected to the smartphone 110 through the network via the communication unit 210.

In step S702, the control unit 207 receives a request for displaying a list of all images from the smartphone 110 via the communication unit 210.

In step S703, the control unit 207 transmits to the smartphone 110 attribute information about the images that are not the candidate images to be automatically deleted among the images recorded in the recording unit 204, i.e., attribute information about the recording target images. More specifically, the control unit 207 transmits to the smartphone 110 the attribute information (e.g., file name, image capturing date and time, thumbnail image) about the images with the deletion candidate flag indicating "0" in the images recorded in the recording unit 204.

In step S711, the control unit 222 of the smartphone 110 is connected to the image capturing apparatus 100 through the network via the communication unit 221.

In step S712, the control unit 222 transmits the request for displaying the list of all images to the image capturing apparatus 100 in response to a user's operation.

In step S713, the control unit 222 receives the attribute information about the recording target images from the image capturing apparatus 100.

In step S714, the control unit 222 displays on the display unit 225 the list of all images recorded in the image capturing apparatus 100. More specifically, the control unit 222 displays on the display unit 225 at least the thumbnail images in the attribute information about the recording target images that is received from the image capturing apparatus 100.

Figure 8:
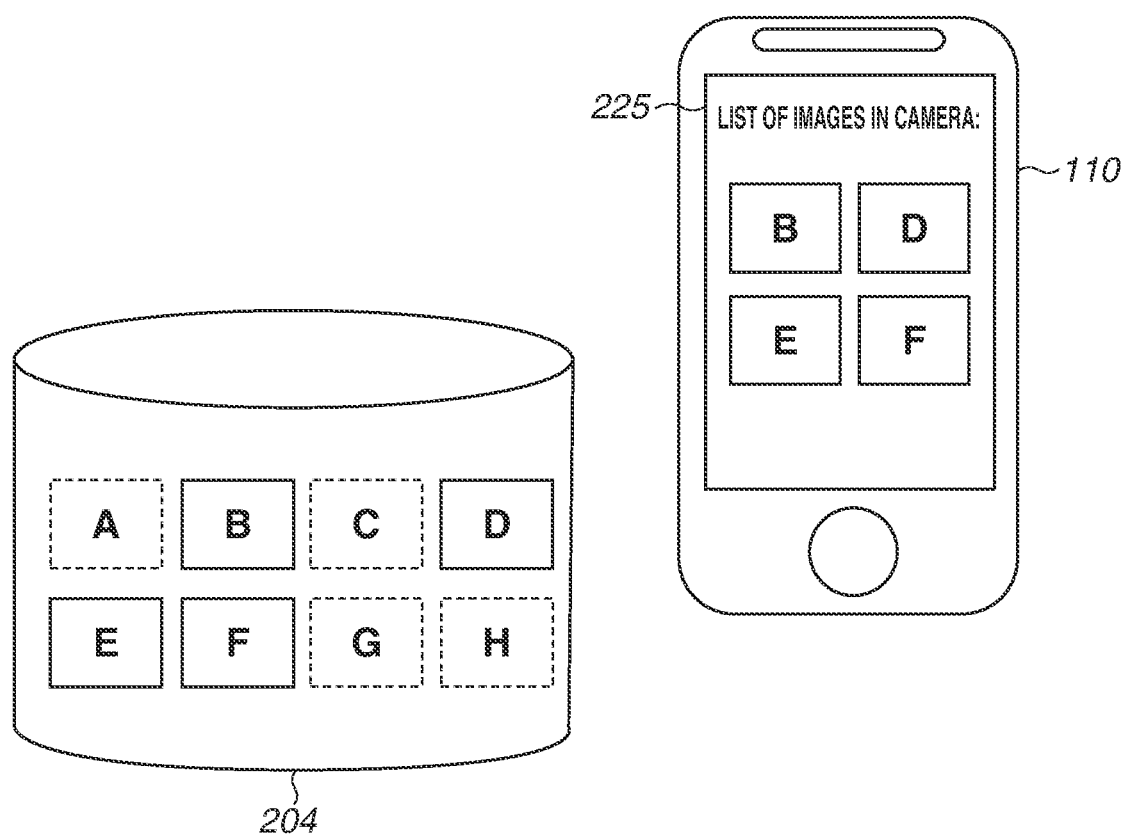
FIG. 8 illustrates an example of a list of all images displayed on a smartphone according to one or more aspects of the present disclosure.

FIG. 8 illustrates examples of the images recorded in the recording unit 204 of the image capturing apparatus 100 and the list of all images displayed on the smartphone 110.

In FIG. 8, a plurality of images A to H is recorded in the recording unit 204. The deletion candidate flag is set to "−1" for the images A, C, G, and H each indicated by a broken line among the images A to H, and the images A, C, G, and H are the candidate images to be automatically deleted. The deletion candidate flag is set to "0" for the images B, D, E, and F each indicated by a solid line among the images A to H, and the images B, D, E, and F are the recording target images and are not the candidate images to be automatically deleted.

Upon receiving the request for displaying the list of all images from the smartphone 110, the attribute information about the images B, D, E, and F among the images A to H is transmitted from the image capturing apparatus 100 to the smartphone 110. Accordingly, the thumbnail images of the images B, D, E, and F are listed on a screen of the display unit 225 of the smartphone 110. As described above, the attribute information about the images that are recorded in the recording unit 204 at the time of receiving the display request from the smartphone 110 but are to be automatically deleted after a short time is not displayed on the smartphone 110.

The smartphone 110 may enable the user to specify the type of images (e.g., a still image, a moving image, a recommended image, an image including a specific subject) to be displayed in the list of images. If the user specifies the image type, then in step S712 described above, the control unit 222 of the smartphone 110 adds information about the specified image type to the display request, and transmits the display request to the image capturing apparatus 100. In a case where the image capturing apparatus 100 receives the display request to which the image type information has been added, then in step S703 described above, the control unit 207 of the image capturing apparatus 100 transmits to the smartphone 110 the attribute information about the images of the specified type among the images with the deletion candidate flag indicating "0".

As described above, according to the present exemplary embodiment, information about the images that are not the candidate images to be automatically deleted (i.e., the images that are to remain recorded in the recording medium without being automatically deleted) is transmitted from the image capturing apparatus 100 to the smartphone 110 via the communication unit 210 so that the information is displayed on the smartphone 110. Thus, in a case where the recorded images are to be automatically deleted, the user of the smartphone 110 can recognize the images that are to remain recorded in the recording unit without being deleted. Furthermore, since information about the candidate images to be automatically deleted is not transmitted to the smartphone 110, the information is not displayed on the smartphone 110. As a result, it is possible to suppress or prevent a phenomenon in which the images that have been viewed once by the user of the smartphone 110 are automatically deleted and disappear from the recording medium. Particularly, even in a case where a larger number of images are automatically captured by the image capturing apparatus 100, the user can easily recognize what images are captured and are to remain recorded in the recording medium.

Next, a remote image capturing system according to a second exemplary embodiment will be described. The remote image capturing system according to the present exemplary embodiment has a configuration similar to that according to the first exemplary embodiment. Differences from the first exemplary embodiment will be described in detail below.

Figure 9:
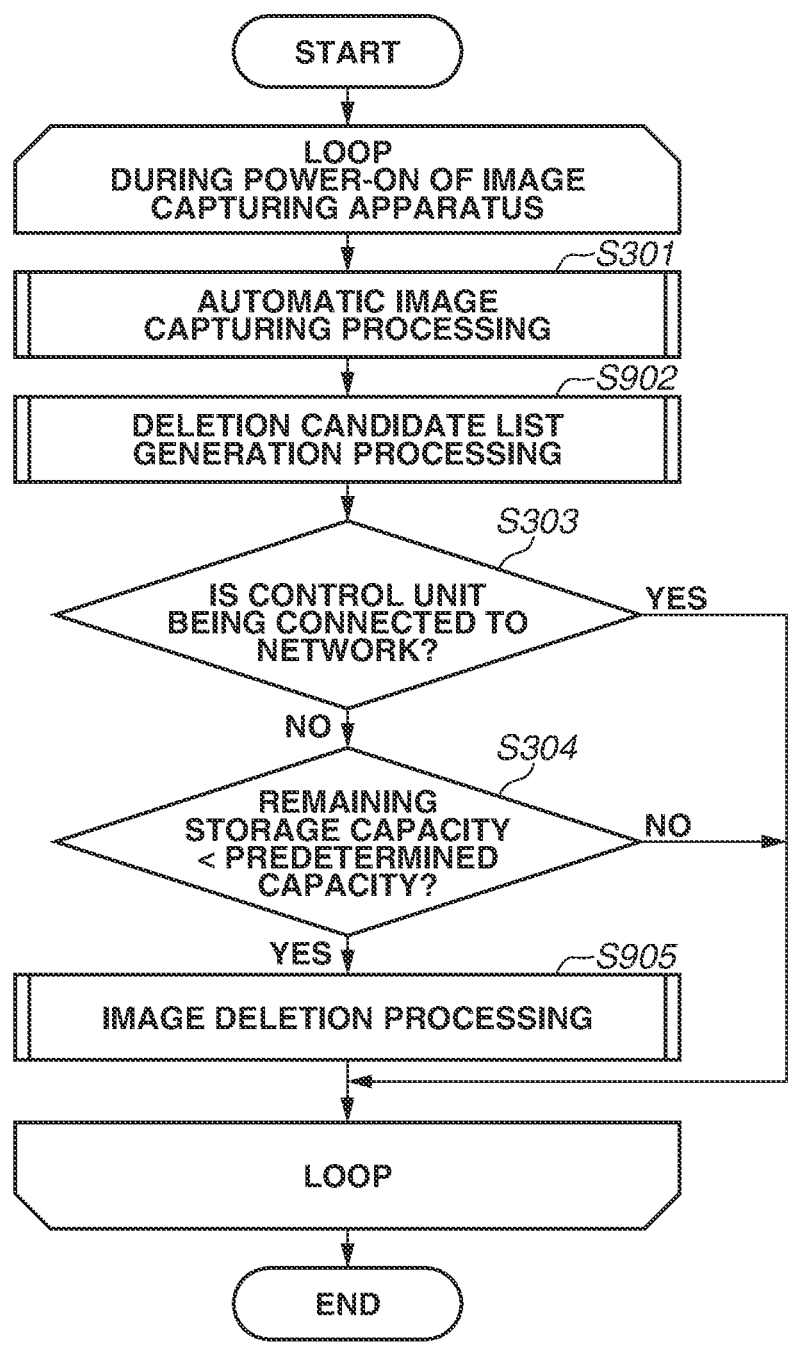
FIG. 9 is a flowchart illustrating an example of control processing according to one or more aspects of the present disclosure.

FIG. 9 is a flowchart illustrating an example of control processing performed by the image capturing apparatus 100. In the flowchart illustrated in FIG. 9, processes (steps S301, S303, and S304) similar to those in FIG. 3 are denoted by the same step numbers and descriptions thereof will be omitted as appropriate.

In step S902, the control unit 207 of the image capturing apparatus 100 performs deletion candidate list generation processing. The deletion candidate list generation processing will be described in detail below with reference to a flowchart illustrated in FIG. 10.

In step S905, the control unit 207 performs image deletion processing for deleting images from the images recorded in the recording unit 204 based on a deletion candidate list. The image deletion processing will be described in detail below with reference to a flowchart illustrated in FIG. 12.

Figure 10:
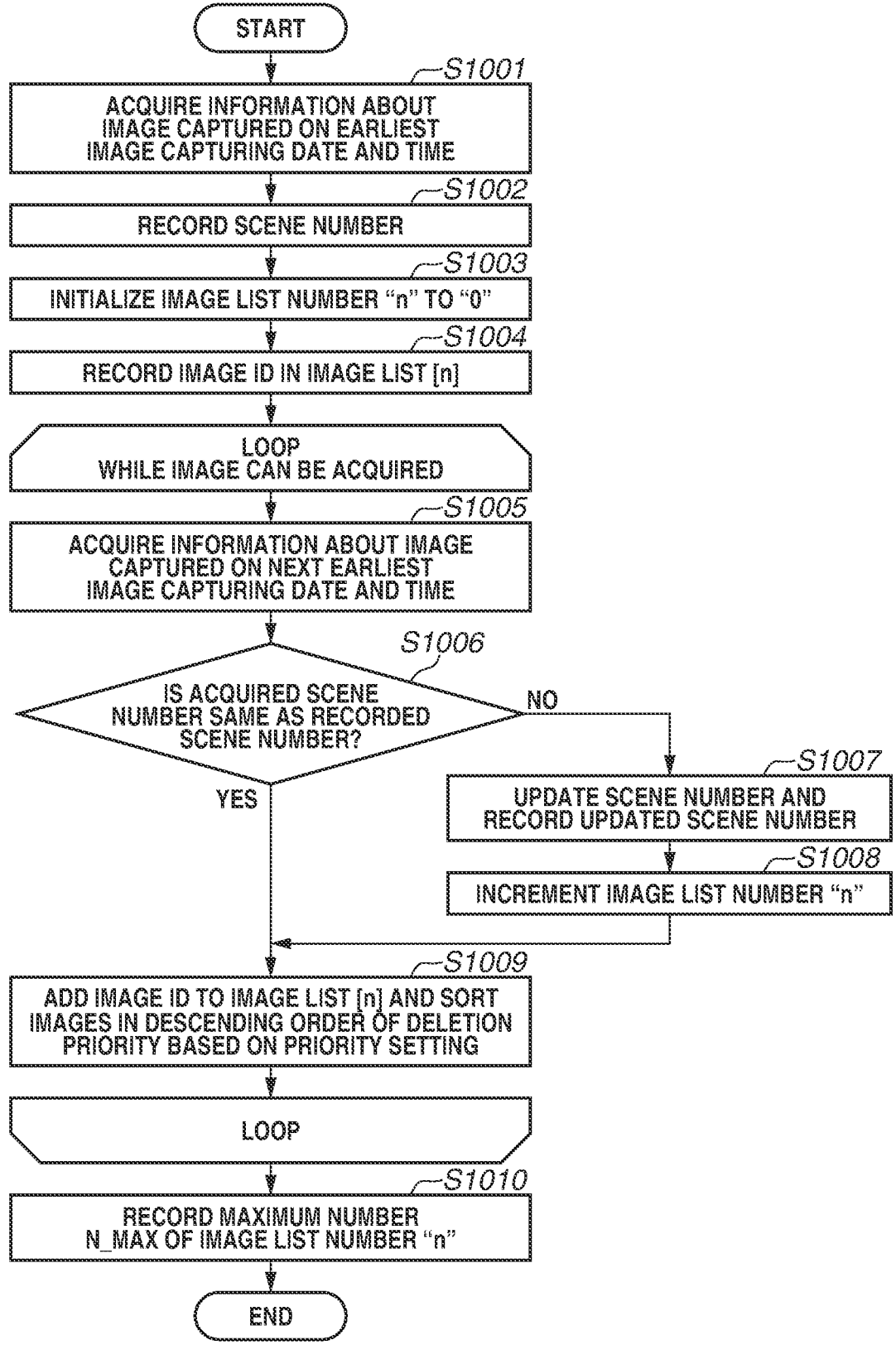
FIG. 10 is a flowchart illustrating an example of deletion candidate list generation processing according to one or more aspects of the present disclosure.

FIG. 10 is a flowchart illustrating an example of the deletion candidate list generation processing performed by the image capturing apparatus 100. FIG. 10 illustrates detailed processing of step S902 illustrated in FIG. 9 described above.

In step S1001, the control unit 207 identifies the image captured on the earliest image capturing date and time from among the captured images and acquires, as information about the identified image, the image ID and the scene number associated with the image. The image ID is information for identifying an image and is assigned to each captured image. The control unit 207 assigns the image ID "001" to the first captured image and records the image ID together with the captured image in the recording unit 204. The control unit 207 assigns the image ID "002", which is obtained by incrementing the image ID by "+1", to the next captured image, and records the image ID together with the captured image in the recording unit 204. Similarly, the control unit 207 assigns the image ID to each of the subsequent images in chronological order of image capturing while incrementing the image ID, and records the image ID together with the image in the recording unit 204.

In step S1002, the control unit 207 temporarily records the acquired scene number in the system memory 212.

In step S1003, the control unit 207 generates a deletion candidate list, records the generated deletion candidate list in the ROM 211, and initializes an image list number n of an image list of images sorted for each scene number in the deletion candidate list to "0".

In step S1004, the control unit 207 records the acquired image ID in the image list [n].

Next, the control unit 207 of the image capturing apparatus 100 repeats processing of steps S1005 to S1009 to be described below while image information can be acquired so that the recorded images are sorted for each scene number in descending order of deletion priority.

In step S1005, the control unit 207 identifies the image captured on the next earliest image capturing date and time and acquires, as information about the identified image, the image ID and the scene number associated with the image.

In step S1006, the control unit 207 determines whether the acquired scene number is the same as the temporarily recorded scene number. If the scene number is different from the temporarily recorded scene number (NO in step S1006), the processing proceeds to step S1007. If the scene number is same as the temporarily recorded scene number (YES in step S1006), the processing proceeds to step S1009.

In step S1007, the control unit 207 updates the temporarily recorded scene number with the acquired scene number and records the updated scene number in the system memory 212. More specifically, the control unit 207 replaces the scene number recorded so far with the scene number acquired in step S1005, and records the scene number.

In step S1008, the control unit 207 increments the image list number n.

In step S1009, the control unit 207 adds and records the acquired image ID in the image list [n]. If the image ID has already been recorded in the image list [n], the control unit 207 sorts the plurality of images including the image with the added image ID in descending order of deletion priority based on a preset priority setting. Items that can be selected as the priority setting include "image capturing date and time", "image score", and "face size", and one of the items is selected and recorded in the ROM 211. Information about each of the items "image capturing date and time", "image score", and "face size" is recorded in the recording unit 204 in association with each image. For example, if the image capturing date and time is selected as the priority setting, an image captured on an earlier image capturing date and time has a higher deletion priority, and an image captured on a later image capturing date and time has a lower deletion priority. If the image score is selected as the priority setting, an image with a lower image score has a higher deletion priority, and an image with a higher image score has a lower deletion priority. If the face size is selected as the priority setting, an image with a smaller face size of a main subject (a person determined to be a main person in an image) has a higher deletion priority, and an image with a larger face size of a main subject has a lower deletion priority. If the image score is selected as the priority setting and images have the same image score, or if the face size is selected as the priority setting and the main subjects of images have the same face size, the image captured on the earlier image capturing date and time has a higher deletion priority.

The priority setting items can be selected from the smartphone 110 by the user.

More specifically, the control unit 222 of the smartphone 110 executes the remote image capturing application to display the priority setting items on the display unit 225 so that one of the priority setting items can be selected. The control unit 222 transmits information about the priority setting item selected by the user to the image capturing apparatus 100 via the communication unit 221. The control unit 207 of the image capturing apparatus 100 records in the ROM 211 the information about the priority setting item received via the communication unit 210, thereby making the priority setting.

In step S1010, if no image information can be acquired, the control unit 207 records a maximum number N_MAX of the image list number n in the system memory 212, and ends the deletion candidate list generation processing.

When the deletion candidate list generation processing is completed, the deletion candidate list in which the image IDs are sorted for each scene in descending order of deletion priority is generated.

Figure 11:
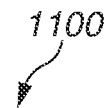
FIG. 11 is a table illustrating an example of a deletion candidate list according to one or more aspects of the present disclosure.

FIG. 11 is a table illustrating an example of the deletion candidate list. In a deletion candidate list 1100, A "n" column indicates the image list number for each scene. In this example, six image list numbers [0] to [5] are set. The maximum number N_MAX of the image list number n is "5".

An "IMAGE ID" column indicates the number for identifying each image. In this example, the image IDs are arranged from the left side in descending order of deletion priority for each image list number n. For example, for the image list number [0], the image IDs 001, 002, 003, and 004 are arranged in this order. Thus, in the image list with the image list number [0], the image with the image ID 001 has the highest deletion priority, and the image with the image ID 004 has the lowest deletion priority.

The deletion candidate list 1100 illustrated in FIG. 11 illustrates an example where the image capturing date and time is selected as the priority setting. As described above, the image IDs are assigned to the images in chronological order of image capturing. If the image capturing date and time is selected as the priority setting, an image captured on an earlier image capturing date and time has a higher deletion priority. Thus, the image IDs included in the image list with each image list number n are arranged from the left side in ascending order of image ID number.

If the image score or the face size is selected as the priority setting, the order of image IDs is changed in the image list with each image list number n. For example, assume that the image score is selected as the priority setting and the images with the image IDs 001, 002, 003 and 004 included in the image list with the image list number [0] have image scores of 70 points, 60 points, 80 points, and 40 points, respectively. In this case, in the image list with the image list [0], the image IDs are arranged from the left side in ascending order of image score, i.e., in the order of 004, 002, 001, and 003.

Figure 12:
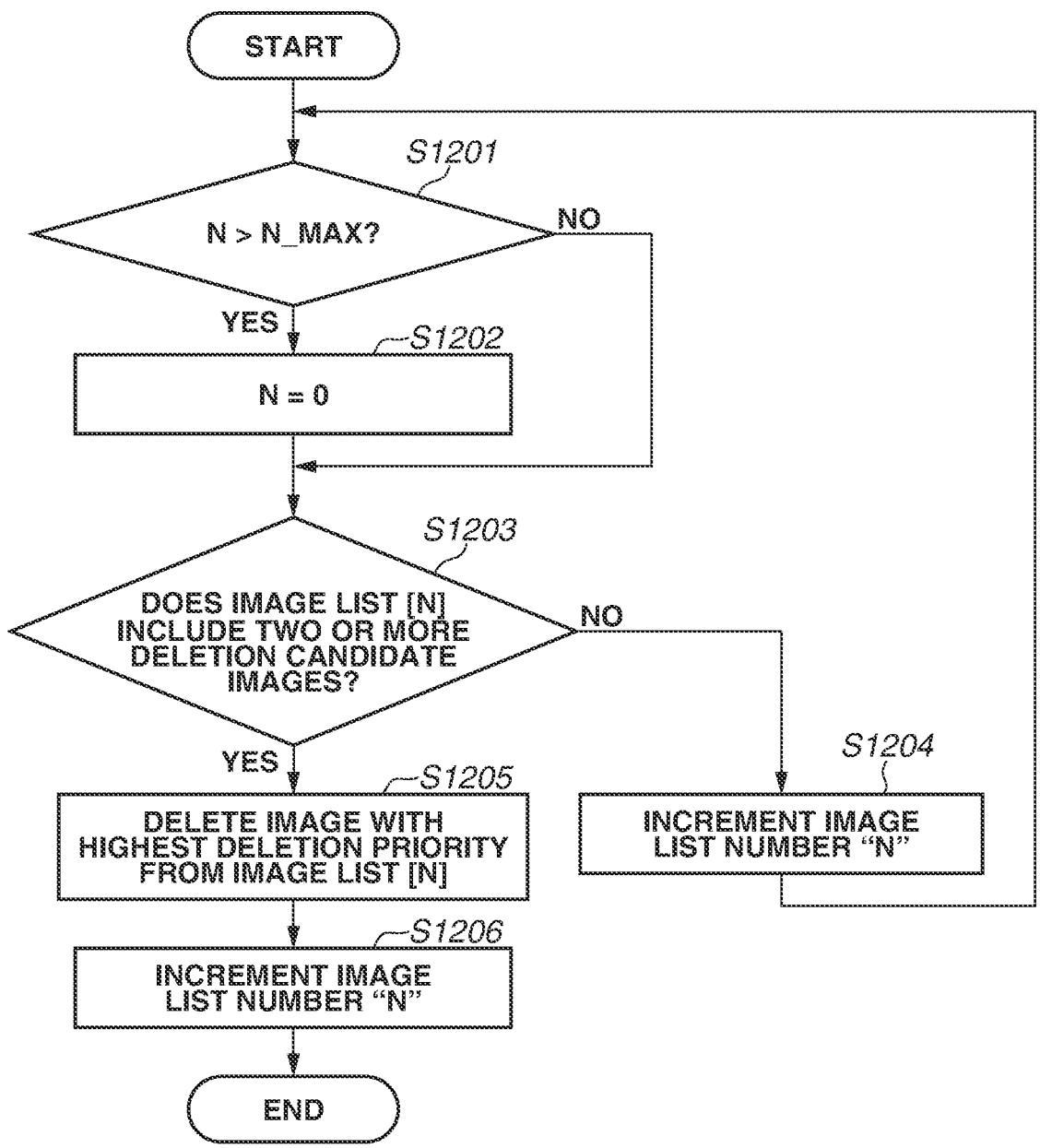
FIG. 12 is a flowchart illustrating an example of image deletion processing according to one or more aspects of the present disclosure.

FIG. 12 is a flowchart illustrating an example of the image deletion processing performed by the image capturing apparatus 100. FIG. 12 illustrates detailed processing of step S905 illustrated in FIG. 9 described above.

In step S1201, the control unit 207 determines whether an image list number N of the image list including the image to be deleted next is greater than the maximum number N_MAX of the image list number. The maximum number N_MAX of the image list number is the value recorded in the system memory 212 in step S1010 illustrated in FIG. 10. If the image list number N is greater than the maximum number N_MAX of the image list number (YES in step S1201), the processing proceeds to step S1202. If the image list number N is less than or equal to the maximum number N_MAX of the image list number (NO in step S1201), the processing proceeds to step S1203 without performing processing of step S1202.

In step S1202, the control unit 207 substitutes "0" into the image list number N.

In step S1203, the control unit 207 refers to the deletion candidate list and determines whether the image list [N] includes two or more candidate images to be deleted. More specifically, the control unit 207 determines whether the image list [N] includes two or more image IDs. If the image list [N] includes two or more image IDs (YES in step S1203), the processing proceeds to step S1205. If the image list [N] includes one image ID (NO in step S1203), the processing proceeds to step S1204 without performing processing of step S1205. In a case where the image list [N] includes one image ID, no image is deleted in step S1205 to be described below. Thus, for each scene, at least one image can remain stored in the recording unit 204.

In step S1204, the control unit 207 increments the image list number N, and the processing returns to step S1201.

In step S1205, the control unit 207 deletes the image with the highest deletion priority from the image list [N].

In step S1206, the control unit 207 increments the image list number N, and ends the image deletion processing.

With the above-described processing, in a case where the remaining storage capacity of the recording unit 204 becomes low, the recorded images are automatically deleted in descending order of deletion priority in step S1205 illustrated in FIG. 12 described above. Thus, the image capturing apparatus 100 can continuously perform the automatic image capturing processing. In the flowchart illustrated in FIG. 12, similarly to the first exemplary embodiment, the processing of steps S1201 to S1206 may be repeated until a predetermined number of images are deleted, and the image deletion processing may be terminated when the predetermined number of images are deleted. In the present exemplary embodiment, the case where, if the image list [N] includes two or more image IDs in step S1203, the processing proceeds to step S1205 has been described. Alternatively, if the image list [N] includes a predetermined number or more (e.g., three or more) image IDs, the processing may proceed to S1205, and if the image list [N] includes less than the predetermined number of image IDs, the processing may proceed to step S1204.

Next, processing performed by the remote image capturing system to enable the user of the smartphone 110 to recognize the images to be automatically deleted will be described.

FIG. 13A is a flowchart illustrating an example of processing performed by the image capturing apparatus 100. FIG. 13B is a flowchart illustrating an example of processing performed by the smartphone 110. The flowcharts illustrated in FIGS. 13A and 13B are performed at any timing during power-on of the image capturing apparatus 100, more specifically, during a period in which the control processing in the flowchart illustrated in FIG. 9 is performed. In the flowcharts illustrated in FIGS. 13A and 13B, processes (steps S701 and S711) similar to those in FIGS. 7A and 7B are denoted by the same step numbers and descriptions thereof will be omitted as appropriate.

In step S1302, the control unit 207 of the image capturing apparatus 100 receives a request for displaying the deletion candidate list from the smartphone 110 via the communication unit 210.

In step S1303, the control unit 207 transmits, to the smartphone 110, the currently recorded deletion candidate list, the attribute information about the images included in the deletion candidate list, and the information about the item selected as the priority setting. The item selected as the priority setting is one of the items "image capturing date and time", "image score", and "face size" recorded in the ROM 211 as described above in step S1009.

In step S1304, the control unit 207 receives the edited deletion candidate list that is edited based on a user's operation and is transmitted from the smartphone 110. The control unit 207 updates the deletion candidate list recorded in the ROM 211 with the received edited deletion candidate list, and records the updated deletion candidate list.

In step S1312, the control unit 222 of the smartphone 110 transmits the request for displaying the deletion candidate list to the image capturing apparatus 100 in response to a user's operation.

In step S1313, the control unit 222 receives the deletion candidate list transmitted from the image capturing apparatus 100.

In step S1314, the control unit 222 displays, on the display unit 225, the deletion candidate list including the candidate images to be automatically deleted from the images recorded in the image capturing apparatus 100. More specifically, the control unit 222 displays the thumbnail images and the image IDs by scene on the display unit 225 based on the deletion candidate list received from the image capturing apparatus 100. At this time, the control unit 222 arranges and displays the thumbnail images from the left side in descending order of deletion priority, similarly to the deletion candidate list. A specific method for displaying the thumbnail images will be described below with reference to FIGS. 14A and 14B.

In step S1315, if the deletion priority of the images is changed by a user's operation, the control unit 222 edits the deletion candidate list based on the changed deletion priority. A specific method for editing the deletion candidate list will be described below with reference to FIGS. 14A and 14B.

In step S1316, the control unit 222 transmits the edited deletion candidate list to the image capturing apparatus 100.

If the deletion priority of the images is changed by a user's operation, the control unit 222 of the smartphone 110 may transmit information indicating details of the changed deletion priority to the image capturing apparatus 100. In this case, the control unit 207 of the image capturing apparatus 100 can edit and update the deletion candidate list based on the information indicating the details of the changed deletion priority, and can record the updated deletion candidate list.

FIG. 14A illustrates an example of the deletion candidate list displayed on the smartphone 110. A deletion candidate list 1400 illustrated in FIG. 14A will be described assuming that the smartphone 110 has received the deletion candidate list 1100 illustrated in FIG. 11.

In the deletion candidate list 1400, an image capturing date and time button 1401, a score button 1402, a face size button 1403, a thumbnail image display portion 1404, a delete button 1405, and an exclude button 1406 are displayed.

The image capturing date and time button 1401, the score button 1402, and the face size button 1403 are sort selection items that can be selected by the user. The thumbnail images displayed on the thumbnail image display portion 1404 are sorted from the left side in descending order of deletion priority, more specifically, in chronological order of image capturing date and time, in ascending order of score, or in ascending order of face size depending on the selected button. FIG. 14A illustrates a state where the image captur-ing date and time button 1401 is selected. When receiving the deletion candidate list 1100 from the image capturing apparatus 100 and displaying the deletion candidate list 1400 first, the control unit 222 of the smartphone 110 displays the deletion candidate list 1400 in a state where the button corresponding to the information, which is received from the image capturing apparatus 100 and indicates the item selected as the priority setting, is selected.

The thumbnail image display portion 1404 divides the scenes into a scene 1 corresponding to the image list number n=0, a scene 2 corresponding to the image list number n=1, and a scene 3 corresponding to the image list number n=2, based on the image list number n of the deletion candidate list and, for each of the scenes, displays the thumbnail images corresponding to the image IDs included in the image list with the corresponding image list number in the deletion candidate list. The thumbnail images for each of the scenes are arranged from the left side in descending order of deletion priority. At the upper right of each of the thumbnail images illustrated in FIG. 14A, the corresponding image ID is displayed for the sake of simplified description. However actually, the image ID is not displayed on the screen. Since the image capturing date and time button 1401 is selected in FIG. 14A, the thumbnail images are displayed from the left side in chronological order of image capturing date and time (in ascending order of image ID) for each scene so that the images are arranged in descending order of deletion priority.

The delete button 1405 is used to issue an instruction to delete a selected image. The user can press the delete button 1405 in a state where the thumbnail image to be deleted is selected in the thumbnail image display portion 1404. In response to the press of the delete button 1405, the thumbnail image display portion 1404, for example, displays the selected thumbnail image on the leftmost side or grays out the selected thumbnail image so that the user can recognize that the image corresponding to the selected thumbnail image is to be deleted or has the highest deletion priority. In this case, the control unit 222 of the smartphone 110 edits the deletion candidate list by arranging the image ID of the selected image on the leftmost side in the image list so that the selected image has the highest deletion priority.

The exclude button 1406 is used to issue an instruction to record a selected image. The user can press the exclude button 1406 in a state where the thumbnail image that is not to be deleted is selected in the thumbnail image display portion 1404. In response to the press of the exclude button 1406, the thumbnail image display portion 1404, for example, displays the selected thumbnail image on the rightmost side, or hides or highlights the selected thumbnail image so that the user can recognize that the image corresponding to the selected thumbnail image is not to be deleted or has the lowest deletion priority. In this case, the control unit 222 of the smartphone 110 edits the deletion candidate list by arranging the image ID of the selected image on the rightmost side in the image list so that the selected image has the lowest deletion priority, or by generating information indicating that the selected image is not to be deleted.

As a result, the user can change the deletion priority of the images to be automatically deleted, using the delete button 1405 and the exclude button 1406 while viewing the images in chronological order of image capturing date and time on the smartphone 110.

FIG. 14B illustrates a deletion candidate list 1410 as another example of the deletion candidate list displayed on the smartphone 110. In the example of FIG. 14B, the selected button is changed from the image capturing date and time button 1401 to the face size button 1403, and thus the thumbnail images are sorted and displayed again on a thumbnail image display portion 1414. More specifically, the thumbnail image display portion 1414 displays the thumbnail images in ascending order of face size and in ascending order of image ID for each scene.

As a result, the user can change the deletion priority of the images to be automatically deleted, using the delete button 1405 and the exclude button 1406 while viewing the images in ascending order of face size on the smartphone 110.

As described above, according to the present exemplary embodiment, the information about the candidate images to be automatically deleted is transmitted from the image capturing apparatus 100 to the smartphone 110 via the communication unit 210 so that the information is displayed on the smartphone 110. In a case where the recorded images are automatically deleted, the user of the smartphone 110 can recognize the images to be deleted. Particularly, in a case where the recorded images are automatically deleted by the image capturing apparatus 100, the user can identify whether the images the user desires to record are to be deleted.

Furthermore, according to the present exemplary embodiment, the user of the smartphone 110 can change the deletion priority by selecting an image that is not to be deleted or an image that is to be deleted. Therefore, even in a case where the recorded images are automatically deleted, the user can keep a desired image in the recording medium, or preferentially delete an undesired image.

The exemplary embodiments of the present disclosure may also be implemented by processing in which a program for implementing one or more functions according to the above-described exemplary embodiments is supplied to a system or an apparatus via a network or a recording medium, and one or more processors in a computer of the system or the apparatus read out and execute the program. The exemplary embodiments of the present disclosure may also be implemented by a circuit (e.g., an application specific integrated circuit (ASIC)) for implementing one or more functions according to the above-described exemplary embodiments.

While the present disclosure has been described above with reference to various exemplary embodiments, the present disclosure is not limited to these exemplary embodiments. The above-described exemplary embodiments can be changed within the scope of the present disclosure, and the above-described exemplary embodiments and modified examples thereof may be combined as appropriate.

While in the above-described first exemplary embodiment, the case where the information about the images that are not the candidate images to be automatically deleted is transmitted from the image capturing apparatus 100 to the smartphone 110 has been described, the exemplary embodiment is not limited thereto. Information about the candidate images to be automatically deleted may also be transmitted. However, in this case, the image capturing apparatus 100 also transmits deletion candidate flag information to the smartphone 110.

Based on the received deletion candidate flag information, it is desirable that the smartphone 110 display each image so that the user can recognize whether the image is the candidate image to be automatically deleted. Furthermore, the smartphone 110 may be configured to edit the deletion candidate flag information for each candidate image to be automatically deleted and the deletion candidate flag information for each image that is not the candidate image to be automatically deleted, in response to a user's operation on the smartphone 110. In this case, the smartphone 110 may transmit the edited deletion candidate flag information to the image capturing apparatus 100, and the image capturing apparatus 100 may automatically delete the recorded images based on the edited deletion candidate flag information.

While in the above-described exemplary embodiments, the case where a scene is determined based on an elapsed time has been described, the exemplary embodiments are not limited thereto. For example, images including the same subject may be determined as images of the same scene, or images captured at the same location may be determined as images of the same scene. In this case, the control unit 207 may set the deletion priority for each scene. For example, in a case where the images including the same subject are determined as the images of the same scene, the control unit 207 may sort the images in ascending order of the image score of the subject, and in a case where the images captured at the same location are determined as the images of the same scene, the control unit 207 may sort the images in ascending order of the number of subjects.

In the above-described exemplary embodiments, various kinds of control processing has been described to be performed by the control unit 207 of the image capturing apparatus 100. Alternatively, the various kinds of control processing may be performed by one piece of hardware or a plurality of pieces of hardware (e.g., a plurality of processors or circuits) sharing the processing to control the entire image capturing apparatus 100.

While in the above-described exemplary embodiments, the case where the image capturing apparatus 100 is a digital camera has been described, the exemplary embodiments are not limited thereto. The exemplary embodiments can be applied to any electronic apparatus as long as the electronic apparatus can capture an image of a subject. Examples of the image capturing apparatus 100 include a smartphone and a tablet personal computer (PC), and the image capturing apparatus 100 can also be applied to any other electronic apparatus.

While in the above-described exemplary embodiments, the case where the smartphone 110 is used as an electronic apparatus that communicates with the image capturing apparatus 100, the exemplary embodiments are not limited thereto. The exemplary embodiments can be applied to any electronic apparatus as long as the electronic apparatus can communicate with the image capturing apparatus 100. Examples of the electronic apparatus include a computer apparatus (a PC, a tablet computer, a media player, or a personal digital assistance (PDA)), a mobile phone, and a game console, and the exemplary embodiments can also be applied to any other electronic apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-005634, filed Jan. 18, 2021, which is hereby incorporated by reference herein in its entirety.

What is claimed is:

1. An image capturing apparatus comprising:
a processor; and
a memory storing a program which, when executed by the processor, causes the image capturing apparatus to:
perform automatic image capturing of a subject by using an image capturing unit;
control a plurality of images acquired by the automatic image capturing to be recorded in a recording unit;
select deletion candidate images from among the plurality of images recorded in the recording unit, based on a predetermined deletion condition;
automatically delete the deletion candidate images; and
perform control so that information about images other than the deletion candidate images, among the plurality of images recorded in the recording unit and including the deletion candidate images before being automatically deleted, is transmitted to an external apparatus via a communication unit before the deletion candidate images are deleted so that the information is displayed on the external apparatus,
wherein in a case where a predetermined image capturing condition is satisfied, the automatic image capturing of the subject is performed, and
wherein in a case where a remaining storage capacity of the recording unit is less than a predetermined capacity after the information is transmitted to the external apparatus, the deletion candidate images are deleted from the plurality of images recorded in the recording unit.

2. The image capturing apparatus according to claim 1, wherein even in the case where the remaining storage capacity of the recording unit is less than the predetermined capacity, if a communication is established between the image capturing apparatus and the external apparatus via the communication unit, the deletion candidate images are not deleted.

3. The image capturing apparatus according to claim 1, wherein in the case where the remaining storage capacity of the recording unit is less than the predetermined capacity, if a number of the deletion candidate images in the plurality of images recorded in the recording unit is more than or equal to a predetermined number, the predetermined number of the deletion candidate images are deleted from the plurality of images recorded in the recording unit, and if the number of the deletion candidate images in the plurality of images recorded in the recording unit is less than the predetermined number, the deletion candidate images recorded in the recording unit are deleted.

4. The image capturing apparatus according to claim 1, wherein the program when executed by the processor further causes the image capturing apparatus to calculate evaluation information for each of the plurality of images acquired by the automatic image capturing, and
wherein the predetermined deletion condition is based on the evaluation information.

5. The image capturing apparatus according to claim 1, wherein the program when executed by the processor further causes the image capturing apparatus to determine a scene of each of the plurality of images acquired by the automatic image capturing, and
wherein the predetermined deletion condition is based on the determined scene.

6. The image capturing apparatus according to claim 5, wherein the predetermined deletion condition is a condition for deleting the deletion candidate images so that, for each of the scenes, at least one of the deletion candidate images remains in the recording unit.

7. The image capturing apparatus according to claim 5, wherein the scene is determined based on an image capturing time interval at which the automatic image capturing is performed.

8. The image capturing apparatus according to claim 5, wherein the scene is determined based on a type of the subject or a number of the subjects.

9. The image capturing apparatus according to claim 5, wherein the scene is determined based on an installation state of the image capturing apparatus.

10. The image capturing apparatus according to claim 5, wherein the program when executed by the processor further causes the image capturing apparatus to drive an optical axis of the image capturing unit in a pan direction, and
wherein the scene is determined based on a pan angle at which the optical axis is driven.

11. A method for controlling an image capturing apparatus, the method comprising:
performing automatic image capturing of a subject by using an image capturing unit;
controlling a plurality of images acquired by the automatic image capturing to be recorded in a recording unit;
selecting deletion candidate images from among the plurality of images recorded in the recording unit, based on a predetermined deletion condition;
automatically deleting the deletion candidate images; and
performing control so that information about images other than the deletion candidate images, among the plurality of images recorded in the recording unit and including the deletion candidate images before being automatically deleted, is transmitted to an external apparatus via a communication unit before the deletion candidate images are deleted so that the information is displayed on the external apparatus,
wherein in a case where a predetermined image capturing condition is satisfied, the automatic image capturing of the subject is performed, and
wherein in a case where a remaining storage capacity of the recording unit is less than a predetermined capacity after the information is transmitted to the external apparatus, the deletion candidate images are deleted from the plurality of images recorded in the recording unit.

12. A non-transitory computer-readable recording medium storing a program for causing a computer to execute a method for controlling an image capturing apparatus, the method comprising:

performing automatic image capturing of a subject by using an image capturing unit;

controlling a plurality of images acquired by the automatic image capturing to be recorded in a recording unit;

selecting deletion candidate images from among the plurality of images recorded in the recording unit, based on a predetermined deletion condition;

automatically deleting the deletion candidate images; and performing control so that information about images other than the deletion candidate images, among the plurality of images recorded in the recording unit and including the deletion candidate images before being automatically deleted, is transmitted to an external apparatus via a communication unit before the deletion candidate images are deleted so that the information is displayed on the external apparatus, wherein in a case where a predetermined image capturing condition is satisfied, the automatic image capturing of the subject is performed, and wherein in a case where a remaining storage capacity of the recording unit is less than a predetermined capacity after the information is transmitted to the external apparatus, the deletion candidate images are deleted from the plurality of images recorded in the recording unit.

* * * * *